(12) United States Patent
Sumioka

(10) Patent No.: US 9,800,180 B2
(45) Date of Patent: Oct. 24, 2017

(54) CONTROL APPARATUS OF VIBRATION-TYPE ACTUATOR

(71) Applicant: CANON KABUSHIKI KAISHA, Tokyo (JP)

(72) Inventor: Jun Sumioka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/046,313

(22) Filed: Feb. 17, 2016

(65) Prior Publication Data

US 2016/0173005 A1 Jun. 16, 2016

Related U.S. Application Data

(63) Continuation of application No. 13/989,144, filed as application No. PCT/JP2011/075243 on Oct. 26, 2011, now abandoned.

(30) Foreign Application Priority Data

Nov. 26, 2010 (JP) ................................ 2010-264218

(51) Int. Cl.
*H02N 2/14* (2006.01)
*H02N 2/00* (2006.01)
*H02N 2/10* (2006.01)

(52) U.S. Cl.
CPC .............. *H02N 2/14* (2013.01); *H02N 2/008* (2013.01); *H02N 2/103* (2013.01); *H02N 2/142* (2013.01)

(58) Field of Classification Search
CPC .......... H02N 2/14; H02N 2/008; H02N 2/103; H02N 2/142

USPC ........................................................ 318/116
See application file for complete search history.

(56) References Cited

U.S. PATENT DOCUMENTS

| 4,273,399 | A | 6/1981 | Myers et al. | |
|---|---|---|---|---|
| 4,623,030 | A * | 11/1986 | Portman, Jr. | ............ G01G 3/13 177/1 |
| 4,816,727 | A * | 3/1989 | Shepard | ............... B25J 17/0208 318/561 |
| 4,965,483 | A | 10/1990 | Abe et al. | |
| 5,438,229 | A | 8/1995 | Ohtsuchi | |
| 5,872,416 | A | 2/1999 | Nogarede | |
| 5,883,705 | A * | 3/1999 | Minne | .................... B82Y 10/00 250/234 |
| 6,205,872 | B1 * | 3/2001 | Pflueg | .................... G01H 11/08 73/593 |
| 7,439,650 | B2 | 10/2008 | Sawada | |
| 8,339,016 | B2 | 12/2012 | Seki et al. | |
| 8,760,036 | B2 | 6/2014 | Kojima | |
| 8,791,623 | B2 | 7/2014 | Tani | |

(Continued)

FOREIGN PATENT DOCUMENTS

| CN | 1892187 A | 1/2007 |
|---|---|---|
| EP | 0610836 A2 | 8/1994 |

(Continued)

*Primary Examiner* — Kawing Chan
(74) *Attorney, Agent, or Firm* — Canon USA, Inc., IP Division

(57) ABSTRACT

Information regarding a rotational speed is detected by utilizing a variation in the amplitude at a frequency corresponding to the number of a plurality of protrusions of a vibrating member generated in an S-phase signal detected from a vibration detection electrode of a vibration-type actuator.

10 Claims, 26 Drawing Sheets

(56) References Cited

U.S. PATENT DOCUMENTS

| | | |
|---|---|---|
| 8,816,568 B2 | 8/2014 | Seki et al. |
| 2002/0095226 A1 | 7/2002 | Suzuki |
| 2003/0015982 A1 | 1/2003 | Cox-Smith et al. |
| 2004/0093935 A1* | 5/2004 | Yamaoka ............... G01Q 70/04 73/105 |
| 2005/0067921 A1 | 3/2005 | Yamamoto |
| 2006/0028657 A1* | 2/2006 | Typpo .................. G01B 11/026 356/623 |
| 2006/0119218 A1 | 6/2006 | Doshida et al. |
| 2007/0188050 A1 | 8/2007 | Hashimoto |
| 2008/0212415 A1 | 9/2008 | Nagao |
| 2010/0117568 A1 | 5/2010 | Iwashita et al. |
| 2013/0032671 A1 | 2/2013 | Giles et al. |
| 2013/0293728 A1 | 11/2013 | Ohashi |
| 2013/0334989 A1 | 12/2013 | Kataoka |

FOREIGN PATENT DOCUMENTS

| | | |
|---|---|---|
| EP | 0966049 A1 | 12/1999 |
| JP | S59-033415 A | 2/1984 |
| JP | S59-132755 A | 7/1984 |
| JP | H06-284755 A | 10/1994 |
| JP | H07-039179 A | 2/1995 |
| JP | 2000-23475 A1 | 1/2000 |
| JP | 3060081 | 7/2000 |
| JP | 2010-158127 A | 7/2010 |
| JP | 2012-005309 A | 1/2012 |

* cited by examiner

S-PHASE SIGNAL WAVEFORM

PULSE OUTPUT SIGNAL

EDGE DETECTION SIGNAL

DETECTION CLOCK SIGNAL

S-PHASE SIGNAL WAVEFORM

ARCSINE COMPUTATION OUTPUT

DETECTION CLOCK SIGNAL

| SET FREQUENCY (Hz) | ESTIMATED VELOCITY (rpm) |
|---|---|
| 50000 | 20 |
| 49500 | 25 |
| 49000 | 40 |
| 48500 | 50 |
| 48000 | 75 |
| 47500 | 110 |
| 47000 | 180 |
| 46500 | 325 |

PHASE DIFFERENCE SIGNAL 90°

PULSE OUTPUT SIGNAL

EDGE DETECTION SIGNAL

DETECTION CLOCK SIGNAL 202　301　302

PROVIDE REGION IN WHICH
THERE IS NO PROTRUSION

S-PHASE SIGNAL
WAVEFORM

ONE ROTATION PERIOD

EDGE DETECTION
SIGNAL

ORIGIN POSITION
DETECTION SIGNAL

CONTROL APPARATUS OF VIBRATION-TYPE ACTUATOR

CROSS-REFERENCE TO RELATED APPLICATION

This application is a Continuation of U.S. application Ser. No. 13/989,144, filed May 23, 2013, which is a National Phase Application of International Application PCT/JP2011/075243, filed Oct. 26, 2011, which claims the benefit of Japanese Patent Application No. 2010-264218, filed Nov. 26, 2010, which are hereby incorporated by reference herein in their entireties.

TECHNICAL FIELD

The present invention relates to a control apparatus of a vibration-type actuator.

BACKGROUND ART

Vibration-type actuators can be divided into standing-wave actuators and traveling-wave actuators in accordance with the type of vibration generated. FIG. 5 illustrates a control apparatus of a traveling-wave vibration-type actuator in the related art. A velocity signal obtained by a velocity detector 107 such as an encoder and a target velocity from a controller, which is not illustrated, are input to a velocity deviation detector 101, and a velocity deviation signal is output. The velocity deviation signal is input to a proportional-integral-derivative (PID) compensator 102 and output as a control signal.

The control signal output from the PID compensator 102 is input to a drive frequency pulse generator 103. A drive frequency pulse signal output from the drive frequency pulse generator 103 is input to a drive circuit 104, and a two-phase alternating voltage whose phases are different from each other by 90° is output. An alternating voltage is a two-phase alternating signal whose phases are different from each other by 90°. The alternating voltage output from the drive circuit 104 is input to an electromechanical energy conversion element of a vibration-type actuator 105, and a moving member of the vibration-type actuator 105 rotates at constant velocity. A driven member 106 (a gear, a scale, a shaft, and the like) connected to the moving member of the vibration-type actuator 105 is driven in such a way as to be rotated. The rotational speed of the driven member 106 is detected by a velocity detector 107 and feedback control is performed such that the rotational speed always becomes close to a target velocity.

As described above, when the rotational speed of a driven member (the same as the rotational speed of a moving member) is detected in the related art, it is necessary to use an optical encoder or the like and accordingly cost inevitably becomes high because of use of a scale and a photodetector. In addition, since a mounting space is needed, it is difficult to reduce the size. Therefore, a method for detecting the velocity without using an optical element such as an encoder is disclosed in PTL 1 and PTL 2.

In PTL 1, a method for detecting the amount of drive by utilizing a signal (hereinafter referred to as the "S-phase signal") output from a vibration detection electrode included in a piezoelectric element is described, the method being realized by shaping a rotor, which is the moving member, in a certain way. Because the pressure at a portion of a vibrating member that is in contact with the rotor varies due to the eccentricity of the rotor, this method utilizes changes in the amplitude of the vibration detection electrode generated in accordance with the rotation of the rotor. Variations (one period per one rotation) in the pressure of the S-phase signal are subjected to signal processing using a low-pass filter, and then the number of pulses of a rectangular signal whose waveform has been shaped is counted in order to detect the amount of drive. As embodiments, a rotor whose circumferential surface is uneven, an eccentric rotor, a rotor provided with grooves, a rotor having a section whose friction coefficient is different, and the like are described.

In PTL 2, uneven portions are provided in a radial direction of a rotor. The amount of rotation of the rotor is detected by converting an envelope of height values of a drive current to a piezoelectric element emphasized by these uneven portions into a continuous or pulse signal. According to PTL 2, in order to generate a modulating component corresponding to the number of uneven portions of the rotor in the envelope of height values, it is necessary to combine the number of traveling waves and the number of protrusions of a vibrating member in the optimum condition.

CITATION LIST

Patent Literature

PTL 1 U.S. Pat. No. 7,439,650
PTL 2 Japanese Patent No. 03060081

SUMMARY OF INVENTION

Technical Problem

In both the above-described two documents, the rotor is provided with periodic protrusions or grooves and information regarding the rotational speed of the rotor and positional information of the rotor are obtained by detecting a modulating signal superimposed upon the amplitude of an S-phase signal, which is a detection signal from the vibration detection electrode.

However, in the above-described method, it is necessary to process a rotor that is normally used.

The present invention detects information regarding the relative movement velocities and positional information of a vibrating member and a moving member without changing the shape of the moving member and without using an optical element such as an encoder.

A control apparatus of a vibration-type actuator according to an aspect of the present invention rotates, relative to a vibrating member, a moving member that is in contact with a plurality of protrusions of the vibrating member by applying an alternating voltage to an electromechanical energy conversion element of the vibrating member including the electromechanical energy conversion element and by generating elliptic motions in the plurality of protrusions of the vibrating member. Information regarding a rotational speed of the moving member is obtained using information regarding a frequency corresponding to the number of the plurality of protrusions, the information regarding the frequency being included in a detection signal from the electromechanical energy conversion element for detecting vibration provided in the vibrating member.

Advantageous Effects of Invention

According to the present invention, it is possible to obtain the information regarding the relative movement velocity and the positional information of the moving member without changing the shape of the moving member and without using an optical element such as an encoder.

DESCRIPTION OF EMBODIMENTS

A control apparatus of a vibration-type actuator in the present invention will be described with reference to the drawings. The control apparatus of the vibration-type actuator in the present invention is applied to the following vibration-type actuator. That is, a vibration-type actuator to be controlled by the control apparatus in the present invention has a vibrating member and a moving member, and the vibrating member vibrates when an alternating voltage is applied to an electromechanical energy conversion element of the vibrating member. The vibration causes a plurality of protrusions of the vibrating member to move in elliptic motions and the moving member, which is in contact with the plurality of protrusions of the vibrating member, to move relative to the vibrating member through friction drive.

The inventor has confirmed through an experiment that an S-phase signal, which is a signal for detecting vibration, includes "a frequency component corresponding to the number of the plurality of protrusions of the vibrating member". In the present invention, this frequency component is utilized as information regarding the relative velocity of the moving member. First, a signal component of a frequency that is included in an S-phase signal and that corresponds to the number of the plurality of protrusions of the vibrating member will be described.

Figure 2A:
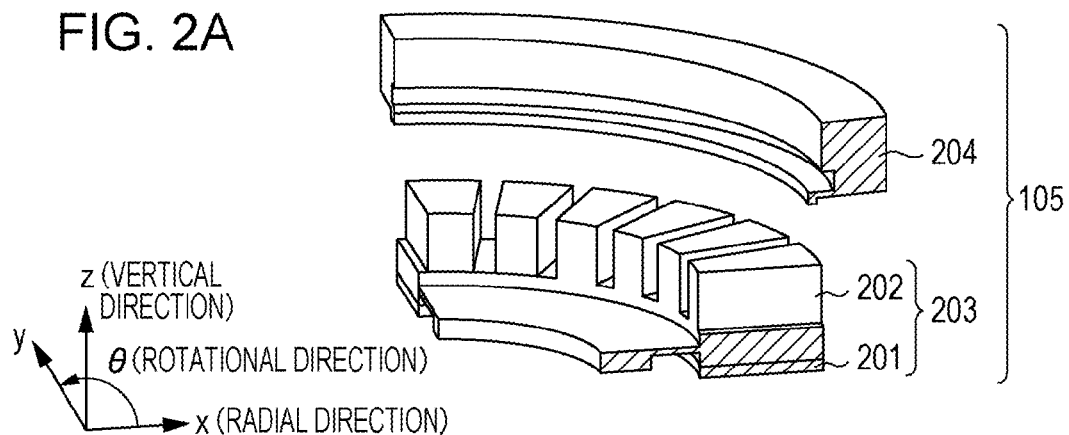
FIGS. 2A, 2B, and 2C are schematic diagrams illustrating an example of a vibration-type actuator.

FIG. 2A is a perspective view of a part of a vibration-type actuator 105. The vibration-type actuator 105 has a vibrating member 203 including an electromechanical energy conversion element 201 such as a piezoelectric element and an elastic member 202, and a moving member 204. Each member has a circular shape in a θ direction illustrated in FIG. 2A. When a two-phase alternating voltage is applied to the electromechanical energy conversion element 201, a traveling wave is generated in the vibrating member 203 and the moving member 204 in contact with the vibrating member 203 is rotated relative to the vibrating member 203 through friction drive.

Figure 2B:
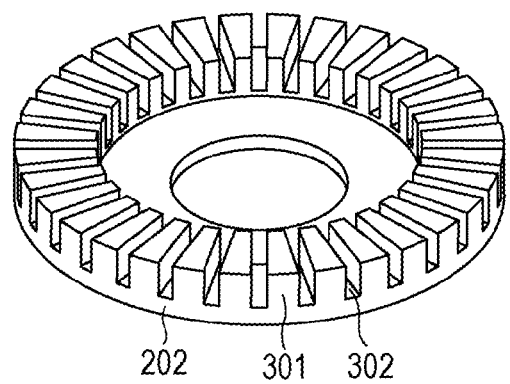

FIG. 2B is a perspective view of the elastic member 202. As illustrated in FIG. 2B, a plurality of protrusions 301 and grooves 302 are alternately provided on a side of the elastic member 202 in contact with the moving member 204. In the example illustrated in FIG. 2B, thirty-two protrusions 301 and thirty-two grooves 302 are provided in a circle. By providing such protrusions 301, it is possible to increase the amplitude of a traveling wave in portions (tops of the protrusions 301) in contact with the moving member 204, thereby obtaining sufficient rotational driving force. "Protrusions" in the present invention will hereinafter refer to portions in contact with the moving member 204 and, like the protrusions 301, portions that protrude relative to the grooves 302.

Figure 2C:
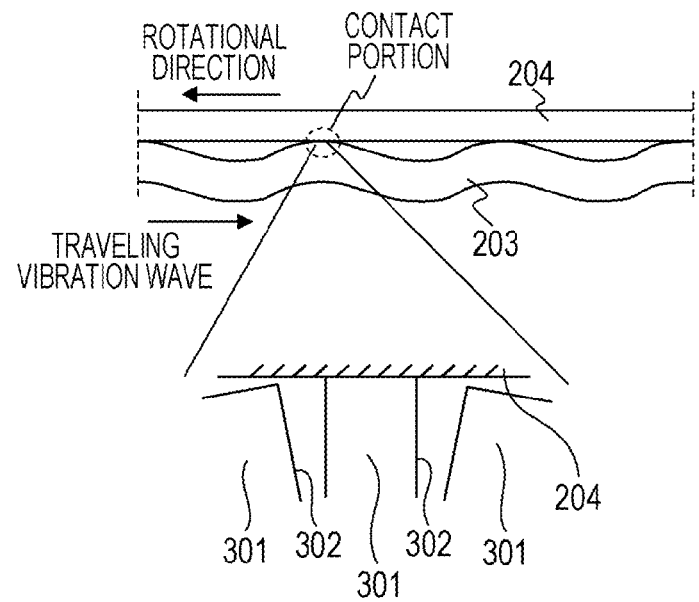

FIG. 2C is a schematic sectional view of the vibrating member 203 and the moving member 204 during driving. In the vibrating member 203, a traveling wave is generated in the right direction illustrated in FIG. 2C, and the moving member 204 moves in a direction opposite the traveling direction of the traveling wave. If a portion in which the traveling wave and the moving member 204 are in contact with each other is magnified, the tops of the protrusions 301 and a surface of the moving member 204 are in contact with each other as illustrated in a lower part of FIG. 2C.

During driving, the contact pressure at the contact portion is ideally the same at any time, but, in practice, because surfaces of both the protrusions 301 and the moving member 204 in contact with each other are uneven, the contact pressure is different depending on the rotational position. That is, the contact pressure varies during one rotation of the moving member 204 in accordance with the number of the protrusions 301. Therefore, a variation is generated in the mechanical resonance frequency of the vibrating member 203 in accordance with the spatial distribution of contact regions of the protrusions 301 in the circumferential direction in synchronization with the rotation of the moving member 204. The variation in the mechanical resonance frequency is considered to become a variation in the amplitude of vibration generated in the vibrating member 203 and generated as periodic variations in the amplitude according to the distribution of the contact regions, that is, the number of the protrusions 301 in synchronization with the rotation of the moving member 204. That is, the number of the protrusions 301 can be considered to correspond to the number of pulses detected by an encoder. Therefore, if the variation in the amplitude of the vibration can be detected, it is possible to obtain information regarding the rotational speed of the moving member 204.

Figure 3:
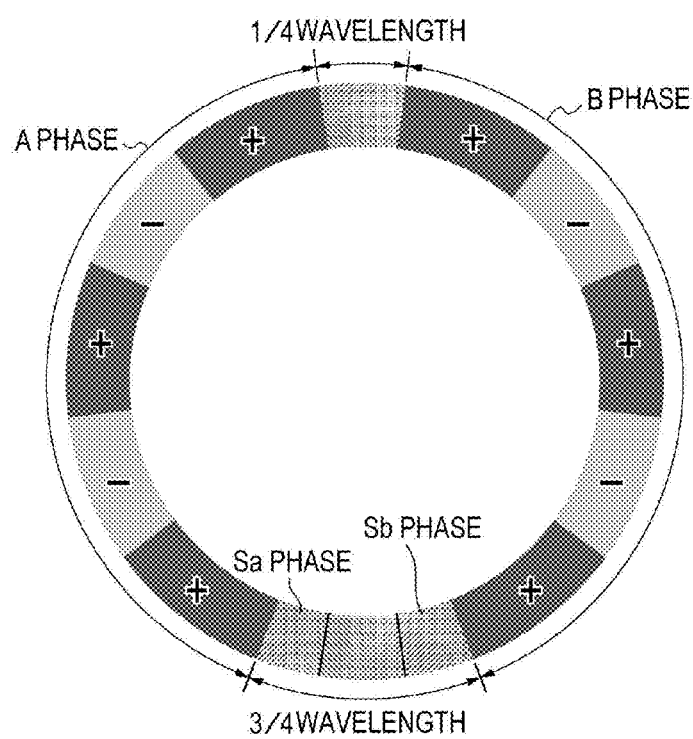
FIG. 3 is a schematic diagram illustrating the polarization states of piezoelectric elements arranged on a back surface of a vibrating member.

FIG. 3 is a schematic diagram illustrating an example of the arrangement states of piezoelectric elements (arrangement positions and polarization states of the piezoelectric elements), which are electromechanical energy conversion elements 201 arranged on a back surface of the vibrating member 203. An A phase and a B phase illustrated in FIG. 3 are first and second piezoelectric element groups arranged on the elastic member 202 in the phases and the polarization state illustrated in FIG. 3. In addition, an Sa phase and an Sb phase are piezoelectric elements for detecting vibration arranged at positions deviated from the A phase and the B phase, respectively, by a ¼ wavelength. These piezoelectric elements that serve as the A phase, the B phase, the Sa phase, and the Sb phase may be provided individually in the vibrating member 203 or may be collectively formed by a polarization process.

In the A phase and the B phase, electrodes (hereinafter referred to as the "A-phase electrode" and the "B-phase electrode") to which drive voltages are to be applied are formed. Because the phases of the drive voltages to be applied to the A phase and the B phase are different from each other by 90°, a travel wave is formed on the surface of the vibrating member 203. Electrodes (hereinafter referred to as the "vibration detection electrodes") are also formed in the Sa phase and the Sb phase, and when the vibration is generated on the surface of the vibrating member 203, voltages are output from the vibration detection electrodes as detection signals in accordance with the state of the vibration.

The vibration-type actuator has a characteristic that the phase relationship between a drive voltage applied to the A-phase electrode and a detection signal (hereinafter referred to as the "S-phase signal"), which is an output voltage from each vibration detection electrode, becomes a particular relationship under the resonance condition. That is, the vibration-type actuator has a characteristic that the phase relationship is determined by the positional relationship between the A phase and the Sa phase, that the resonance condition is established when the phases of a drive signal applied to the A phase and an S-phase signal output from the Sa phase are different from each other by 90°, and that the phase difference becomes larger as the resonance condition is deviated from by a larger extent.

The inventor has detected the S-phase signal and confirmed that periodic variations in the amplitude are actually generated in accordance with the number of the protrusions 301 of the vibrating member 203. Results will be described hereinafter.

Figure 4A:
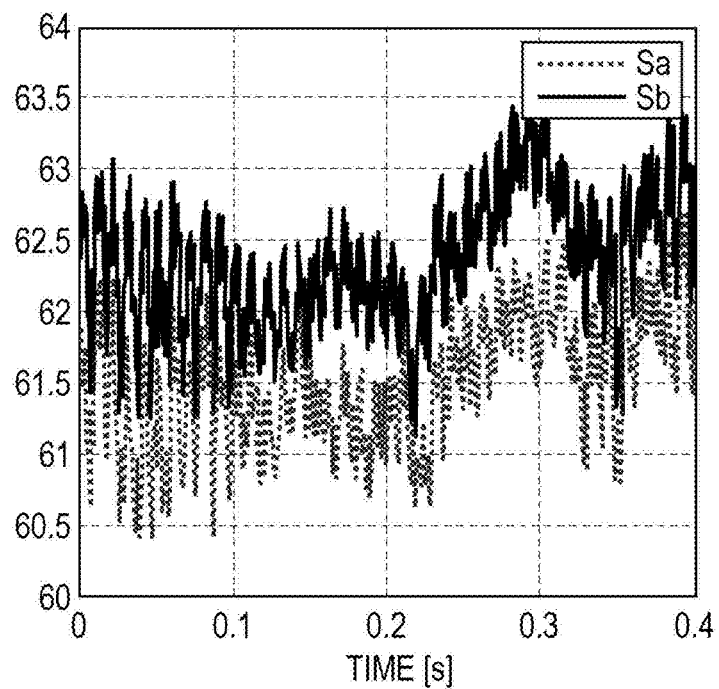
FIGS. 4A and 4B illustrate variations in the amplitude of a measured S-phase signal over time and results of a frequency analysis, respectively.
Figure 5:
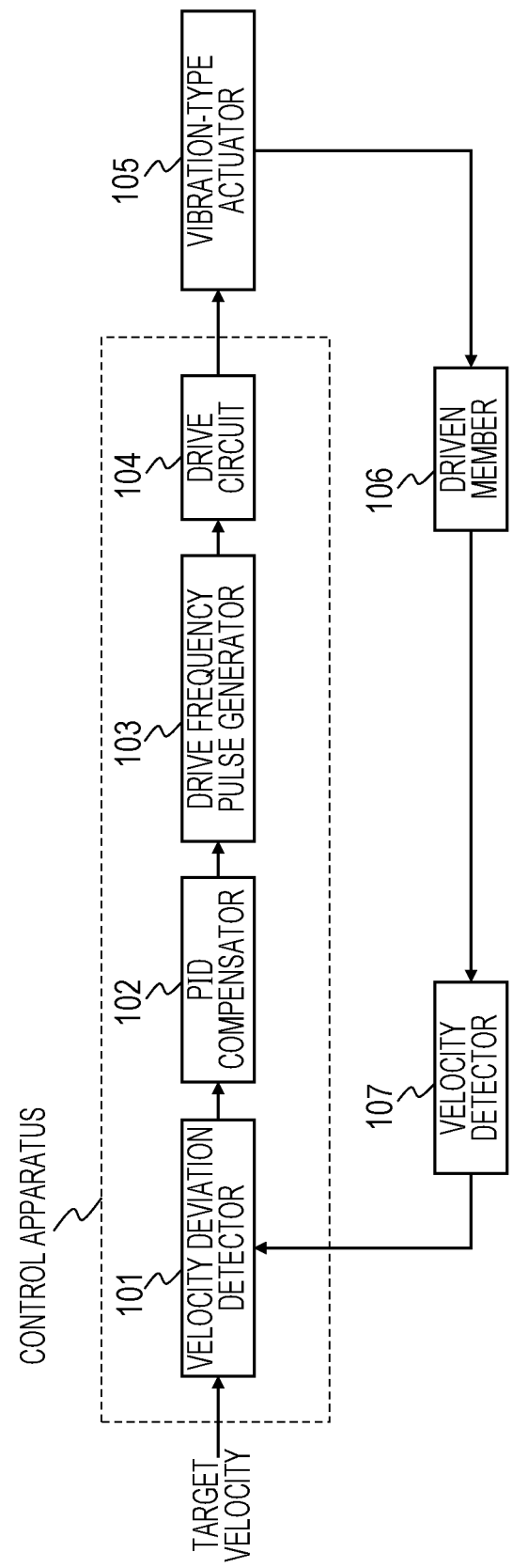
FIG. 5 is a block diagram illustrating a control apparatus of a traveling-wave vibration-type actuator in the related art.

FIG. 4A illustrates variations in the amplitude of the measured S-phase signal over time. The horizontal axis represents time and the vertical axis represents the amplitude of the S-phase signal. In this measurement, a control circuit of a vibration-type actuator in the related art illustrated in FIG. 5 was used. In addition, velocity control was performed such that the velocity became 130 rpm. The voltage of the S-phase signal was reduced by performing resistive voltage division using an external circuit, which is not illustrated, and then a root mean square-direct current (RMS-DC) conversion process was performed and waveform data was obtained using a measuring device, which is not illustrated. The RMS-DC conversion process is a process in which the effective value of an alternating current (AC) signal is converted. In the experiment, an integrated circuit (IC) for general purpose use was used for the conversion. Therefore, a drive frequency component, which is an AC component of the S-phase signal, was removed and the direct current (DC) variations in the effective value of the amplitude of the S-phase signal was output. In the experiment, the number of protrusions 301 of the vibrating member 203 was forty-six. FIG. 4A illustrates variations in the amplitudes of the Sa phase and the Sb phase. The amplitudes were modulated at a frequency corresponding to the number of the protrusions 301 of the vibrating member 203, namely forty-six.

Figure 4B:
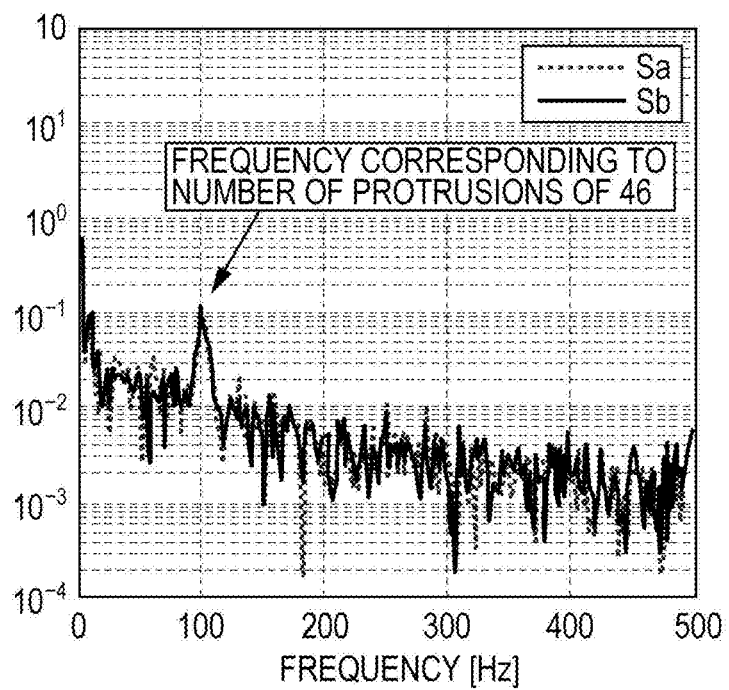

FIG. 4B illustrates results obtained by performing a Fourier transform on the S-phase signal that has been subjected to the RMS-DC conversion process and by performing a frequency analysis of the amplitude. The horizontal axis represents the frequency and the vertical axis represents the varying amplitude. As can be seen from FIG. 4B, the peak is generated at the position of a frequency of 100 Hz. As an expression (1) represents, the peak indicates a frequency corresponding to the number of the protrusions 301 of the vibrating member 203, namely forth-six. The "frequency corresponding to the number of the protrusions 301" is, as represented by the expression (1), a frequency calculated from the product of the number of the protrusions 301 and the rotational speed.

$$46 \times 130 \text{ (rpm)}/60 = 100 \text{ (Hz)} \qquad \text{Expression (1)}$$

That is, the frequency corresponding to the number of the protrusions 301, namely forty-six, is detected in accordance the rotational speed of the moving member 204. The inventor has also performed measurements under other conditions such as a case in which the number of the protrusions 301 has been changed and a case in which the rotational speed has been changed, and has confirmed that a variation at the frequency calculated by the expression (1) is generated as the peak under any condition.

In other words, this means that the rotational speed can be calculated backward by detecting, as necessary, a frequency or a period with which the amplitude reaches the peak thereof during driving. If the period with which the amplitude reaches the peak thereof is denoted by T (s), the rotational speed is represented by the following expression (2):

Rotational speed (rpm)=(1/$T$)×60/46    Expression (2)

If this expression is converted into an expression for representing the period of the rotational speed, the period of the rotational speed is represented by the following expression (3):

Period of rotational speed (s)=$T$×46    Expression (3)

Thus, by detecting a frequency or a period of a signal component included in an S-phase signal corresponding to the number of the protrusions 301, it is possible to detect the information regarding the rotational speed of the moving member 204. In the present invention, information regarding velocity such as the rotational speed or the period of the rotational speed is expressed as the "rotational speed information". In addition, the frequency and the period corresponding to the number of the protrusions 301 are expressed as the "frequency information". When the rotational speed information is obtained by a calculation, the frequency corresponding to the number of the protrusions 301 may be used or the period corresponding to the number of the protrusions 301 may be used.

Using such a method for detecting the rotational speed information, it is possible to detect the relative velocity of the moving member 204 without processing the moving member 204 to obtain uneven portions such as periodic protrusions. In addition, since uneven portions are not provided on the moving member 204, unnecessary vibrations due to the uneven portions are not generated, thereby suppressing variations in the rotational speed.

Specific embodiments of the present invention will be described hereinafter.

First Embodiment

Figure 1:
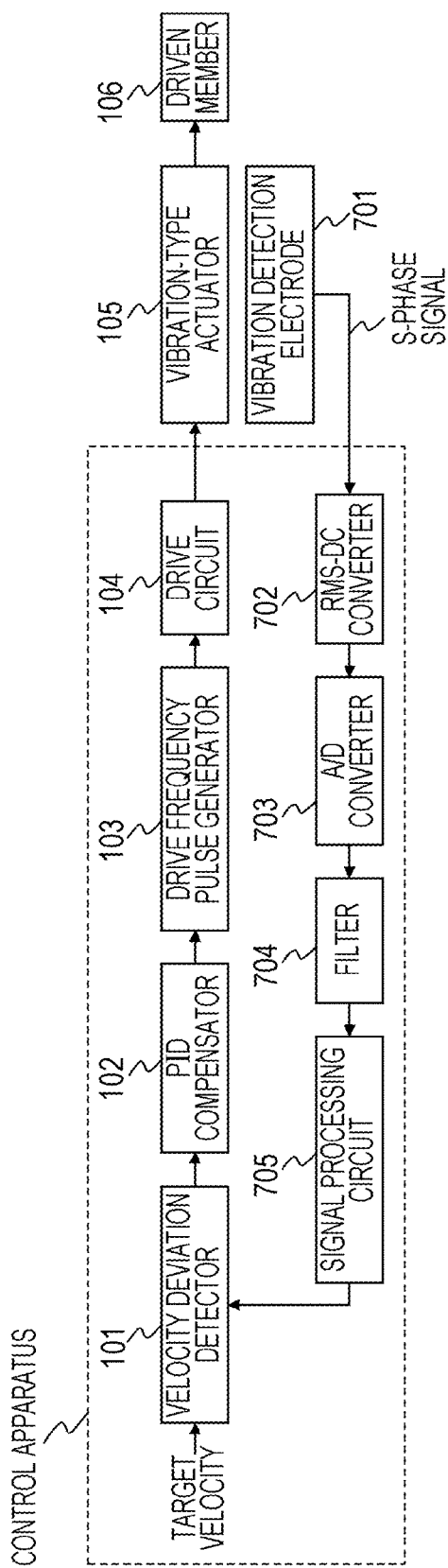
FIG. 1 is a block diagram illustrating a control apparatus of a vibration-type actuator according to a first embodiment of the present invention.

FIG. 1 is a block diagram illustrating a control apparatus of a vibration-type actuator according to a first embodiment of the present invention. The control apparatus according to this embodiment includes an RMS-DC converter 702, an analog-to-digital (A/D) converter 703, a filter 704, a signal processing circuit 705, a velocity deviation detector 101, a PID compensator 102, a drive frequency pulse generator 103, and a drive circuit 104.

The velocity deviation detector 101 receives obtained rotational speed information as well as information regarding a target velocity information such as an instruction value of the velocity from a controller, which is not illustrated, and outputs a velocity deviation signal. The velocity deviation signal is input to the PID compensator 102 and output as a control signal. The PID compensator 102 is a component obtained by adding outputs of compensators having functions of proportion (P), integration (I), and derivation (D), respectively, and is generally used to construct a stable and high-precision control apparatus by compensating a phase delay or gain of a control target.

The control signal output from the PID compensator 102 is input to the drive frequency pulse generator 103. The drive frequency pulse generator 103 generates a pulse signal having a drive frequency in accordance with the input control signal and may be a digital divider circuit, a voltage-controlled oscillator (VCO), or the like. In addition, a pulse signal whose pulse width changes in accordance with the control signal through pulse-width modulation (PWM) control may be generated. The pulse signal having the drive frequency output from the drive frequency pulse generator 103 is input to the drive circuit 104, and a two-phase alternating voltage whose phases are different from each other by 90° is output. The alternating voltage is a two-phase alternating signal whose phases are different from each other by 90°. The drive circuit 104 may be, for example, a transformer coupling type voltage booster circuit or an LC booster circuit having a switching function or the like.

The alternating voltage output from the drive circuit 104 is input to an electromechanical energy conversion element of the vibration-type actuator 105, and a moving member of the vibration-type actuator 105 relatively rotates. A driven member 106 connected to the vibration-type actuator 105 is subjected to rotational drive together with the moving member.

Next, a portion for detecting the rotational speed information from a detected S-phase signal, which is a characteristic of the present invention, will be described.

First, an S-phase signal is detected from a vibration detection electrode 701 included in the vibration-type actuator 105. Although an example in which outputs from the Sa phase and the Sb phase are detected is illustrated in FIG. 3, it is usually sufficient to detect either output. A drive frequency component is removed from the S-phase signal by the RMS-DC converter 702 and an effective DC variation component of the amplitude is detected. The S-phase signal is then converted from an analog signal into a digital signal by the A/D converter 703. The filter 704 extracts a signal component whose frequency corresponds to the number of protrusions of a vibrating member from the S-phase signal, which has been converted into a digital signal. The filter 704 is configured by a general digital filter, namely a FIR filter or an infinite impulse response (IIR) filter. For example, a frequency signal corresponding to the number of protrusions of the vibrating member is extracted from the S-phase signal by setting a filter coefficient in order to limit the bandwidth such that the characteristics of the FIR filter become those of a band-pass filter.

Figure 6A:
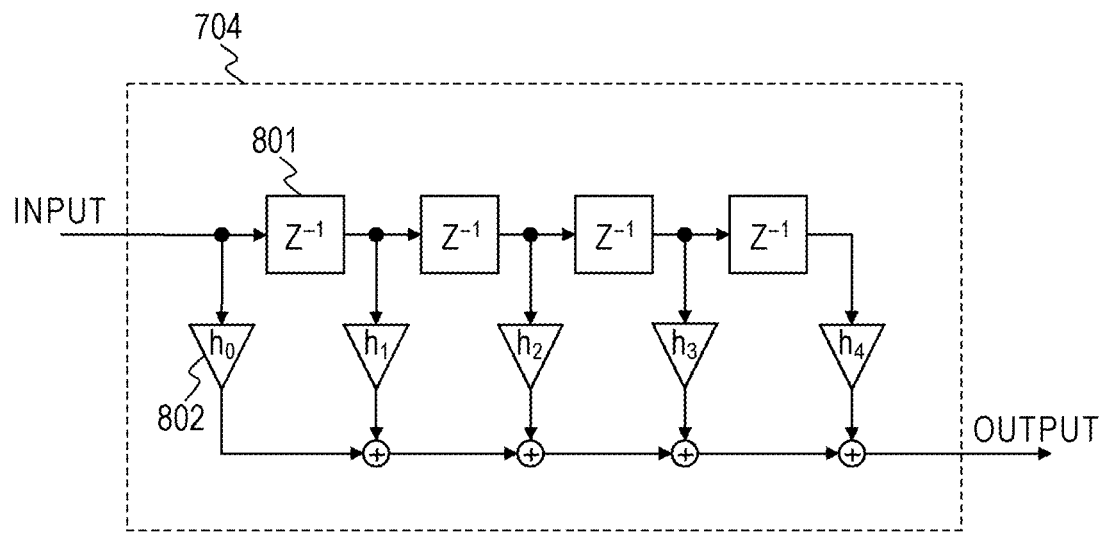
FIG. 6A is a block diagram illustrating an example of a 4th-order finite impulse response (FIR) filter.

FIG. 6A is a block diagram illustrating an example of a 4th-order FIR filter. An FIR filter is a filter whose impulse response is expressed by finite duration, which serves as a filter coefficient. Input signals are sequentially stored in registers 801, and each register 801 generates a delay of one sampling period. Signals that have been delayed by one sampling period are multiplied by $h_0$ to $h_4$ filter coefficients 802, respectively, and then all the signals are added and output. The signs "$h_0$ to $h_4$" indicate the filter coefficients 802, which determine the impulse response of the filter, that is, the frequency characteristics of the filter 704. By adjusting the filter coefficients 802, it is possible to configure a band-pass filter having a pass band width in a desired frequency band. The pass band width is determined by a difference between a cut-off frequency f1 on the lower frequency side and a cut-off frequency f2 on the higher frequency side.

Figure 6B:
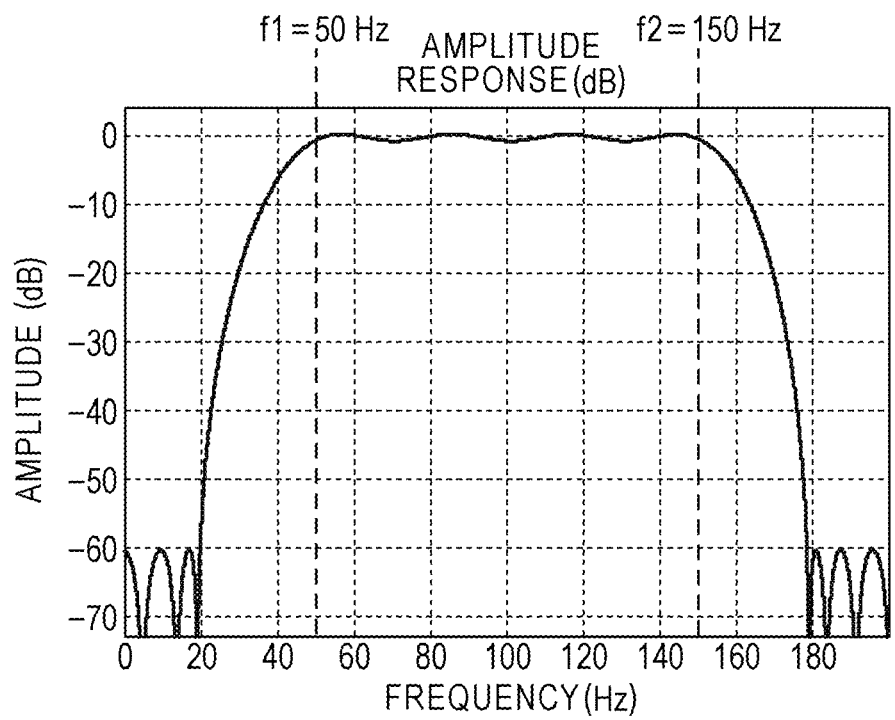
FIG. 6B is a graph illustrating the amplitude response of a band-pass filter configured by a 36th-order FIR filter.

FIG. 6B is a graph illustrating the amplitude response of a band-pass filter configured by a 36th-order FIR filter. The horizontal axis represents the frequency (Hz) and the vertical axis represents the amplitude response (dB). The band-pass filter is designed such that the cut-off frequency f1 on the lower frequency side is 50 Hz and the cut-off frequency f2 on the higher frequency side is 150 Hz. The pass band width is 100 Hz. As illustrated in FIG. 4B, since the frequency corresponding to the number of protrusions of the vibrating member is 100 Hz, the band-pass filter is designed, using this frequency as the center frequency, such that bands each extending from the center frequency by 50 Hz become the pass bands. By using such a band-pass filter, low-frequency DC variations and high-frequency noise included in the S-phase signal can be removed, thereby improving the accuracy with which the rotational speed information is detected, that is, the signal-to-noise (S/N) ratio.

Figure 7A:
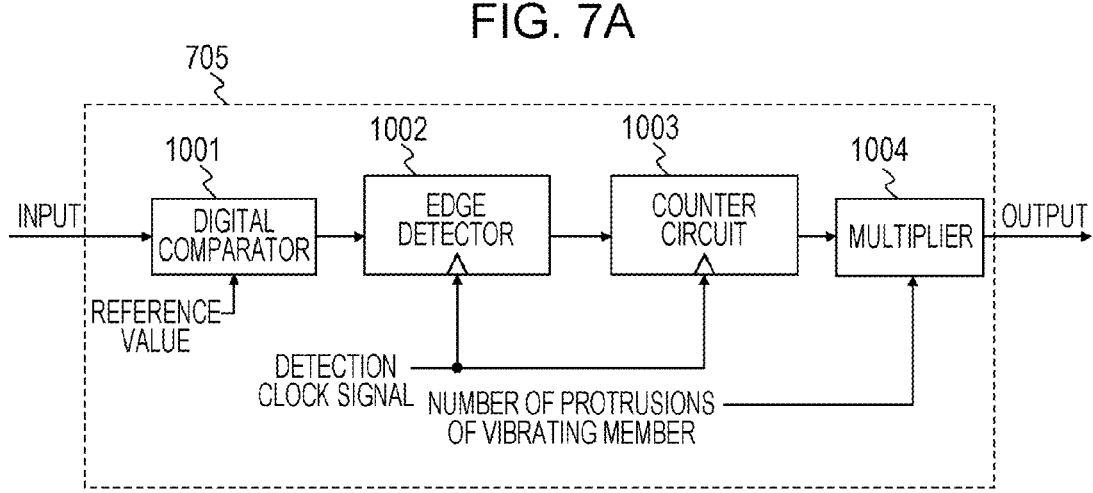
FIGS. 7A to 7E are a block diagram illustrating the configuration of a signal processing circuit and charts illustrating a signal processing method for detecting rotational speed information from an S-phase signal.
Figure 7B:
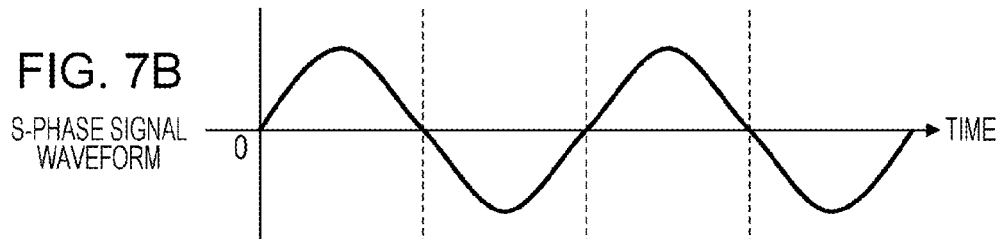
Figure 7C:
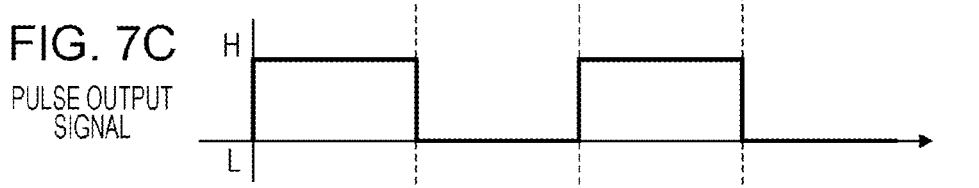
Figure 7D:
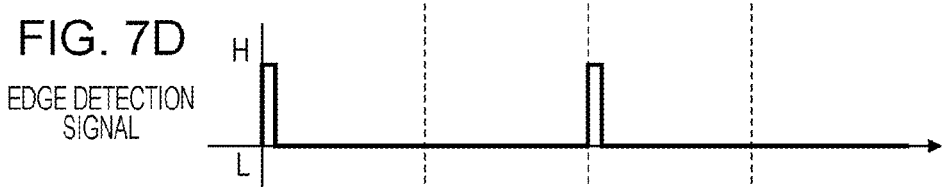
Figure 7E:
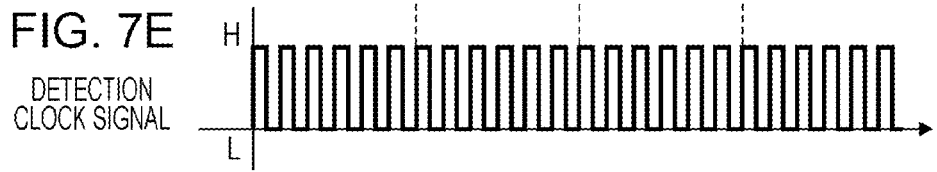

The S-phase signal whose unnecessary components have been removed by the filter 704 is converted into rotational speed information by the signal processing circuit 705. FIG. 7A is a block diagram illustrating the configuration of the signal processing circuit 705. The S-phase signal that has passed through the band pass filter is initially input to a digital comparator 1001 and output as a pulse signal. The input waveform of the S-phase signal is illustrated in FIG. 7B, and the output pulse signal is illustrated in FIG. 7C. The digital comparator 1001 is configured by a general digital comparator, and compares the magnitudes of the input signal and a reference value in order to output the H or L level. Next, the pulse signal is input to an edge detector 1002 and a rising edge thereof is detected by a detection clock signal. The edge detector 1002 includes a flip-flop circuit and a logic gate that operate by receiving a detection clock signal illustrated in FIG. 7E. A rising edge signal output by the edge detector 1002 is illustrated in FIG. 7D. One period of the rising edge signal is a period corresponding to the number of protrusions of the vibrating member.

Next, the period of the rising edge signal is detected by a counter circuit 1003. The counter circuit 1003, which operates by receiving the detection clock signal, counts up each time a rising edge signal is input, and outputs the period of the signal. Next, in order to convert the counted period of a signal into the period of the rotational speed of the moving member, the period of the signal is input to a multiplier 1004. The multiplier 1004 performs arithmetic processing at the timing of the rising edge signal. That is, the multiplier 1004 multiplies the counted period of the signal by the number of protrusions of the vibrating member, namely forty-six, and outputs the product as information regarding the period of the rotational speed of the moving member. Although the period of one rotation of the moving member is output as the rotational speed information here, a period corresponding to one protrusion of the vibrating member may be output. In this case, the target period of the velocity may be set to 1/46 and the deviation in the period of the velocity may be obtained.

Figure 8A:
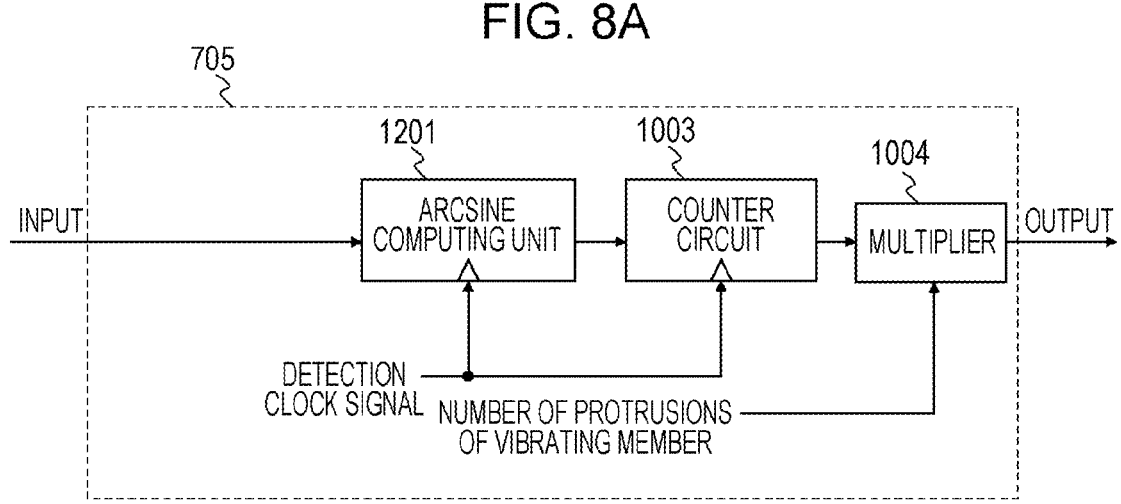
FIGS. 8A to 8D are a block diagram illustrating a signal processing circuit for detecting a period through arcsin computation and charts illustrating a method for detecting the period through the arcsin computation.
Figure 8B:
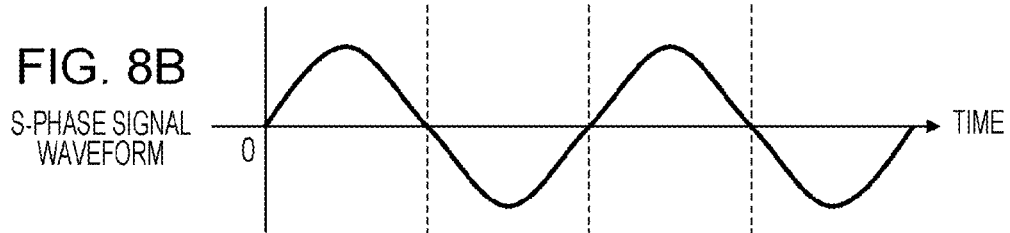
Figure 8C:
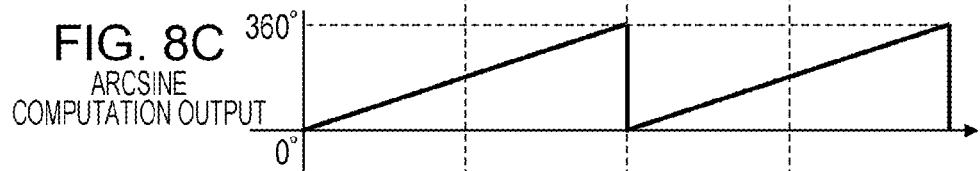
Figure 8D:

In addition, in order to increase the detection power of the period of the signal, the following method may be used. FIG. 8A illustrates a method for detecting the period through arcsin computation. An S-phase signal is input to an arcsin computing unit 1201 that operates by receiving a detection clock signal. The value of the signal having a sine waveform illustrated in FIG. 8B is read at the timing of a detection clock and arcsin computation is performed. Results of the computation are detected as phase information ranging from 0° to 360° illustrated in FIG. 8C and one period can be increased to the resolution power of the detection clock. However, because the arcsin computing unit 1201 can have two phases (θ and 180−θ) in relation to the results of the arcsin computation having a certain value of the amplitude, a logical operation is performed such that a larger value than that of a phase detected at one detection clock before a current clock is always selected. The output results of the computation are input to the counter circuit 1003 and converted into a counter value of the period of the signal. In a similar manner, the counted period of the signal is input to the multiplier 1004 and converted into the period of the rotational speed of the moving member.

Next, the period of the rotational speed output from the signal processing circuit 705 is input to the velocity deviation detector 101 and a velocity deviation from the target velocity is detected. On the basis of this velocity deviation, the vibration-type actuator is subjected to feedback control. It is to be noted that although an example in which the velocity deviation is detected as a period counted by a detection clock has been described in this embodiment, the velocity deviation may be, needless to say, detected as a frequency. In addition, although an example in which the vibration-type actuator is controlled by the drive frequency has been described, another method, that is, for example, a method for controlling the vibration-type actuator with the drive voltage, may be used.

Second Embodiment

In this embodiment, a method for detecting the rotational speed information more accurately by largely increasing the S/N ratio of a component in which the amplitude varies when the variation in an S-phase signal is detected will be described. More specifically, an embodiment in which a repetitive controller is used to detect a variation in the amplitude of an S-phase signal will be described. Components that are the same as those illustrated in FIG. 1 are the same as in the first embodiment, and therefore description thereof is omitted.

Figure 9:
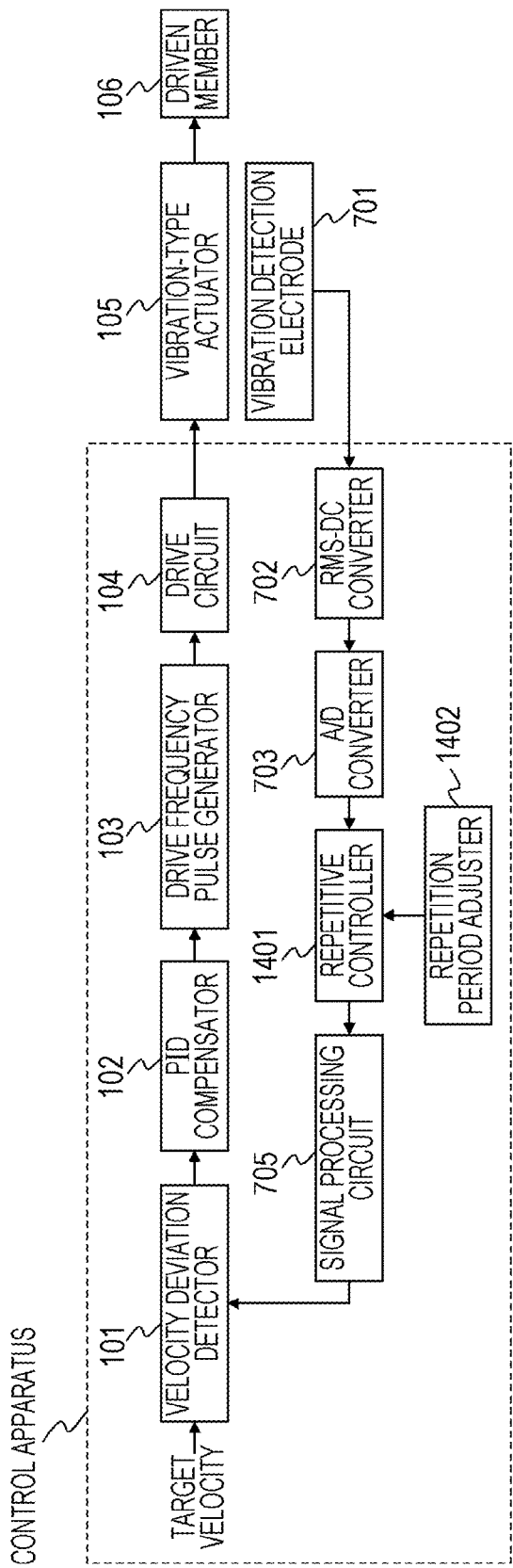
FIG. 9 is a block diagram illustrating a control apparatus of a vibration-type actuator according to a second embodiment of the present invention.

FIG. 9 is a block diagram illustrating a control apparatus of a vibration-type actuator according to a second embodiment of the present invention at a time when repetition control is used. An S-phase signal that has been converted into a digital signal by the A/D converter 703 is input to a repetitive controller 1401 and the S/N ratio of a frequency signal corresponding to the number of protrusions of a vibrating member is largely increased.

Figure 10:
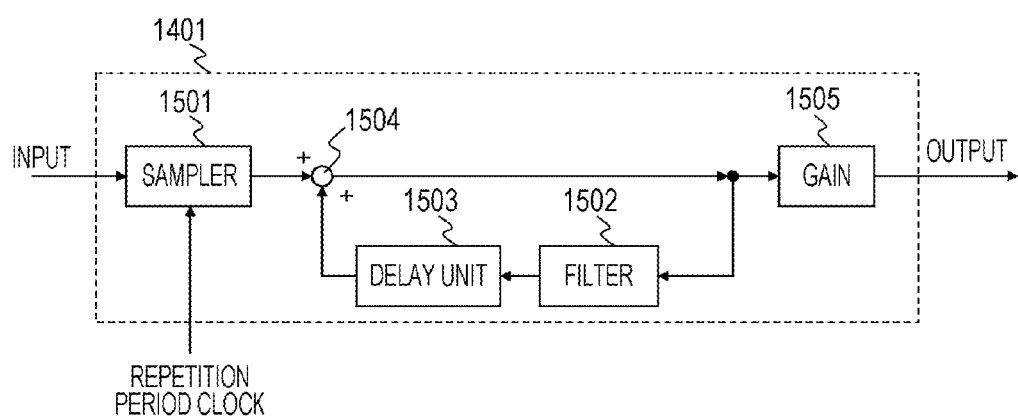
FIG. 10 is a block diagram illustrating the configuration of a repetitive controller according to the second embodiment of the present invention.

FIG. 10 is a block diagram illustrating the configuration of the repetitive controller 1401 to which the present invention can be applied. The S-phase signal input to the repetitive controller 1401 is sampled by a sampler 1501 in a certain discrete time. An output signal from the sampler 1501 is delayed by one repetition period by passing through a filter 1502 and a delay unit 1503, and added to output signals from the sampler 1501 by an adder 1504. The filter 1502 may be, for example, a low-pass filter illustrated in FIG. 6A. In addition, the amount of delay of the delay unit 1503 can be changed by connecting registers in series and adjusting the number of the registers.

Here, the repetition period is set to one period or half a period of a frequency corresponding to the number of protrusions of the vibrating member at a time when the target velocity is set as the rotational speed. That is, the repetition period is set to one period or half a period of a frequency represented by the product of the number of protrusions and the target velocity. For example, if the number of protrusions of the vibrating member is forty-six and the target velocity is 130 rpm, the signal frequency of a component of the S-phase signal in which the amplitude is modulated is represented by the following expression (4):

$$46 \times 130 \text{ (rpm)}/60 = 100 \text{ (Hz)} \qquad \text{Expression (4)}$$

Therefore, the repetition period may be set to the reciprocal of the signal frequency of the modulating component as represented by an expression (5) or may be set to half the reciprocal of the frequency of the modulating component.

Repetition period=1/100=0.01 (s)    Expression (5)

More specifically, a repetition period adjuster 1402 illustrated in FIG. 9 generates a repetition period clock, which is then input as a clock of the sampler 1501. That is, the repetition period clock is set on the basis of the target velocity and the number of protrusions of the vibrating member. Output signals that have been added over repetition periods are subjected to a multiplication process performed by a gain 1505 and then output. Thus, the repetitive controller 1401 integrates only frequency signals corresponding to the number of protrusions of the vibrating member as repetition periods are accumulated, thereby making it possible to largely increase the S/N ratio.

The S-phase signal whose S/N ratio has been increased by the repetitive controller 1401 is input to the signal processing circuit 705 and the rotational speed information is detected as in the first embodiment. Thus, it is possible to detect the rotational speed information more accurately.

Third Embodiment

Figure 11:
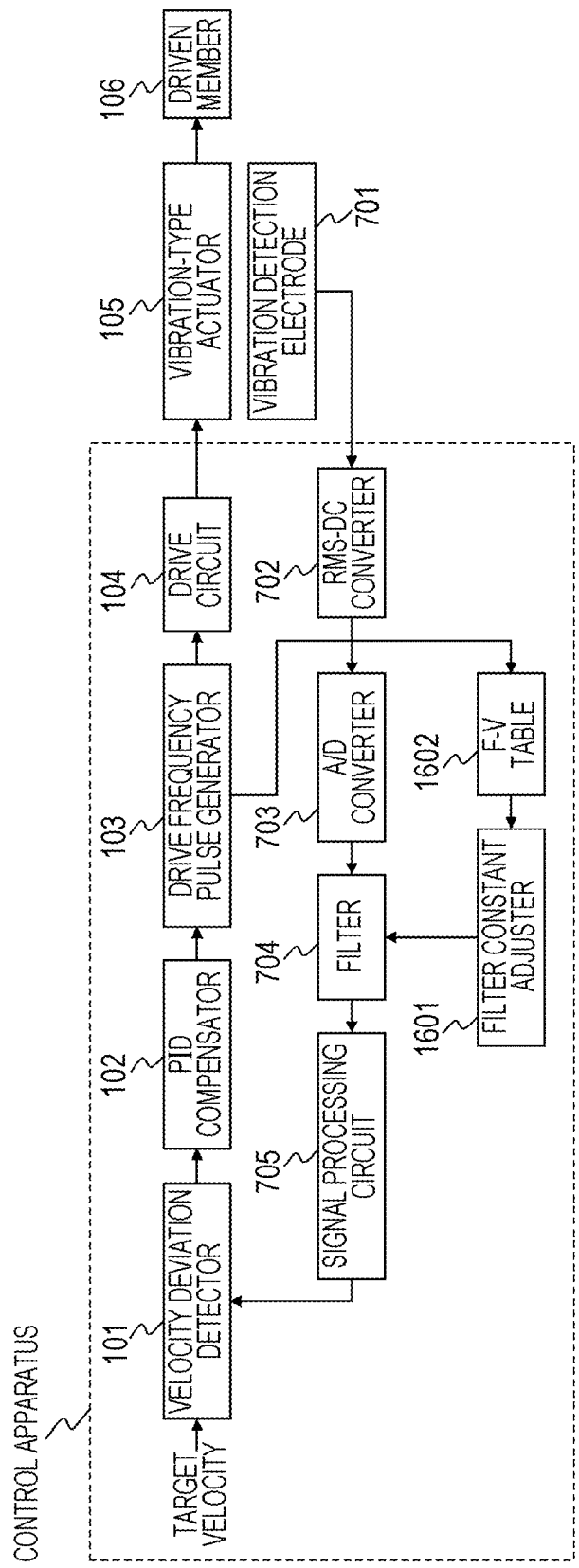
FIG. 11 is a block diagram illustrating a control apparatus of a vibration-type actuator according to a third embodiment of the present invention.

This embodiment is characterized by a method thereof for setting the center frequency of a band-pass filter on the basis of the drive frequency and the velocity characteristics of a vibration-type actuator. FIG. 11 is a block diagram illustrating a control apparatus of a vibration-type actuator according to a third embodiment of the present invention. The basic configuration is the same as in the first embodiment, and description of components that are the same as those of the control apparatus illustrated in FIG. 1 is omitted.

The method for setting the center frequency of the band-pass filter on the basis of the drive frequency-velocity characteristics (hereinafter referred to as the "F-V characteristics") of the vibration-type actuator will be described hereinafter.

The filter 704 is configured as a band-pass filter and may be, for example, an FIR digital filter illustrated in FIGS. 6A and 6B. The pass band width of the band-pass filter is determined by the cut-off frequency f1 on the lower frequency side and the cut-off frequency f2 on the higher frequency side and can be adjusted by changing the filter coefficient. Although the center frequency of the pass band width is set to 100 Hz in FIG. 6B, the velocity of the moving member when activated is lower than the target velocity and the frequency corresponding to the number of protrusions of the vibrating member is about 50 Hz. That is, while the velocity at the time of activation is rising to the target velocity, the center frequency of the band-pass filter is appropriately adjusted in accordance with the velocity. In doing so, noise can be removed more effectively.

The center frequency of the band-pass filter is adjusted by a filter constant adjuster 1601, which changes the filter coefficient. The filter constant adjuster 1601 calculates the center frequency on the basis of the estimated rotational speed (estimated velocity) of the moving member and determines the filter coefficient. Here, if the number of protrusions of the vibrating member is assumed to be forty-six, the center frequency is represented by an expression (6):

46×Estimated velocity/60=Center frequency (Hz)    Expression (6)

Since it is difficult to calculate the filter coefficient during driving, for example, a value of the filter coefficient corresponding to the center frequency may be stored in a memory in advance as a table and may be read during driving.

The estimated velocity input to the filter constant adjuster 1601 is obtained on the basis of a table of the F-V characteristics. An F-V table 1602 is a table in which data regarding the drive frequency and the rotational speed of the vibration-type actuator that have been measured in advance is saved. It is to be noted that not a table but a relational expression between the drive frequency and the rotational speed may be saved in a memory.

Figures 12A, 12B:
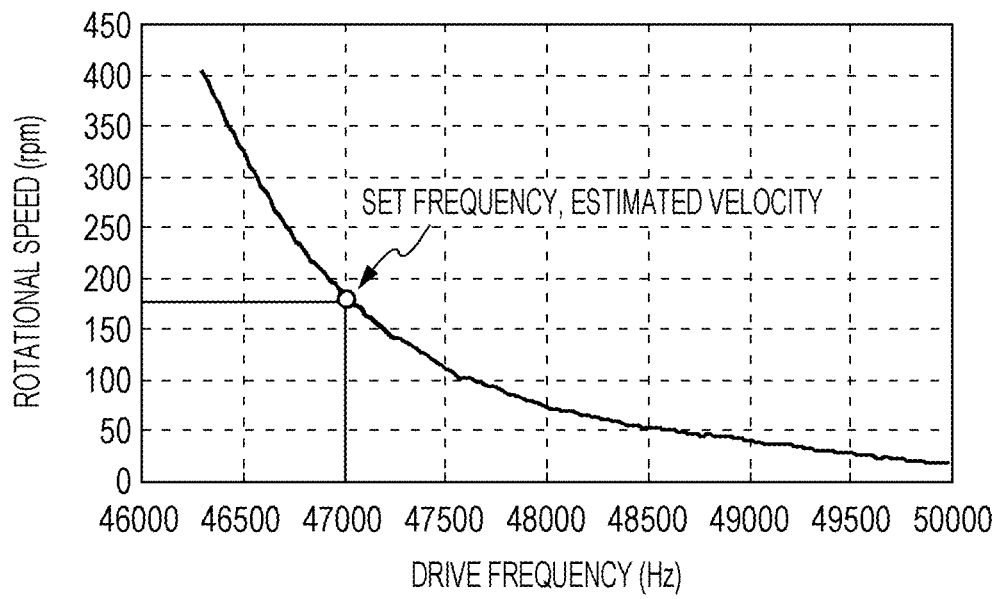
FIGS. 12A and 12B illustrate an example of table data of the drive frequency and the rotational speed of the vibration-type actuator.

FIG. 12A illustrates measured data of the drive frequency and the rotational speed. FIG. 12B is a table illustrating discrete data of the set frequencies and the estimated velocities on the basis of the measured data. In order to perform smooth activation, the initial drive frequency is set to, for example, 50 kHz. Therefore, the estimated velocity when the set frequency is 50 kHz is 20 rpm. Thus, data regarding the drive frequency is input from the drive frequency pulse generator 103 and the estimated velocity is read from the table data on the basis of the data regarding the drive frequency. As a result, even if the frequency of a signal corresponding to the number of protrusions of the vibrating member changes during driving, it is possible to appropriately adjust the center frequency of the band-pass filter, thereby making it possible to accurately detect the rotational speed information.

Fourth Embodiment

Figure 13A:
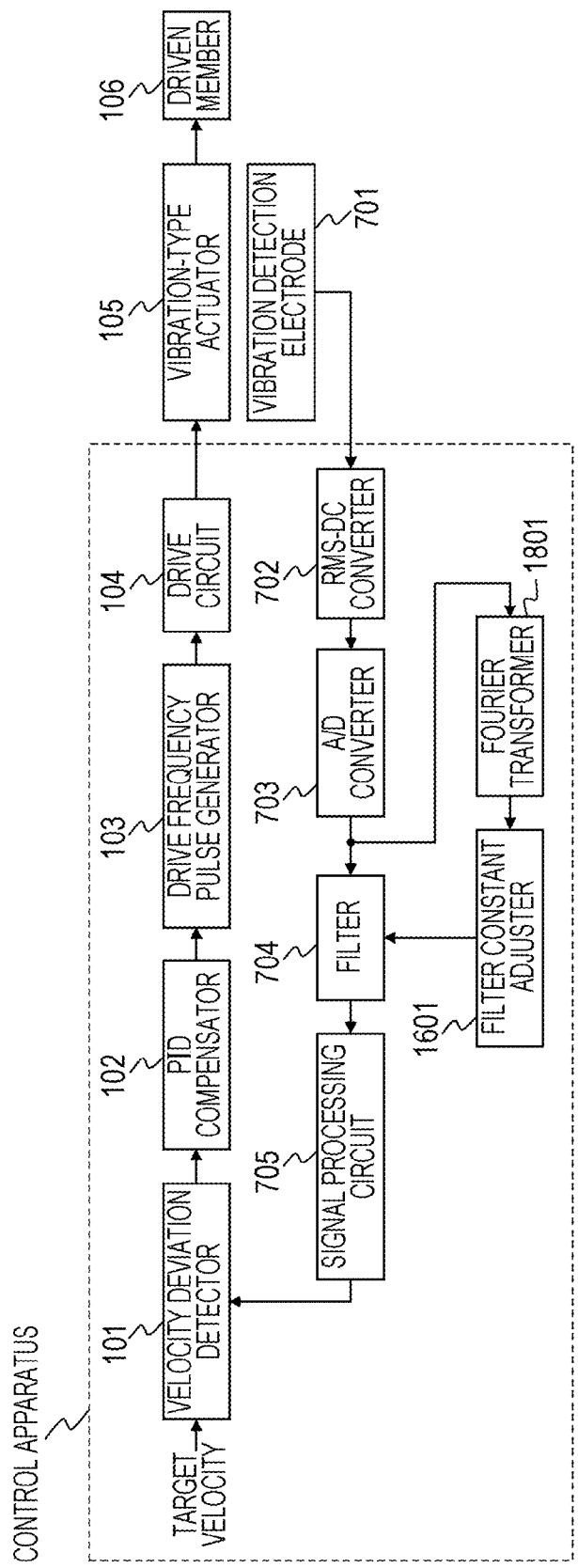
FIGS. 13A and 13B are a block diagram illustrating a control apparatus of a vibration-type actuator according to a fourth embodiment of the present invention and a graph illustrating the frequency characteristics of the amplitude of an S-phase signal that has been subjected to a Fourier transform, respectively.

This embodiment is characterized in that an S-phase signal is subjected to a frequency analysis during driving and a frequency at which the amplitude is largest (peak) is set as the center frequency of a band-pass filter. FIG. 13A is a block diagram illustrating a control apparatus of a vibration-type actuator according to a fourth embodiment of the present invention. The basic configuration is the same as in the first embodiment, and description of components that are the same as those of the control apparatus illustrated in FIG. 1 is omitted.

Figure 13B:
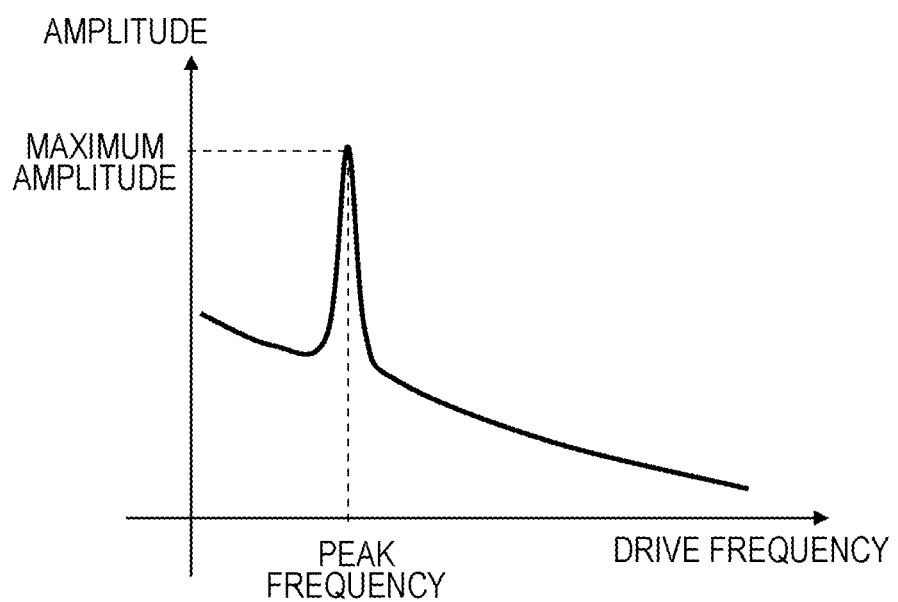

In this embodiment, an S-phase signal output from the A/D converter 703 is input to the band-pass filter as well as to a Fourier transformer 1801. The Fourier transformer 1801 performs discrete multiplication of a plurality of frequencies in order to obtain the frequency characteristics of the amplitude illustrated in FIG. 13B. The frequency at which the amplitude reaches the peak thereof is detected and output as the peak frequency. The value of the peak frequency is input to the filter constant adjuster 1601 and the filter constant is adjusted such that the center frequency of the band-pass filter matches the peak frequency. As a result, even if the frequency of a signal corresponding to the number of protrusions of the vibrating member changes during driving, the center frequency of the band-pass filter is appropriately adjusted, thereby making it possible to accurately detect the rotational speed information.

Fifth Embodiment

Figure 14:
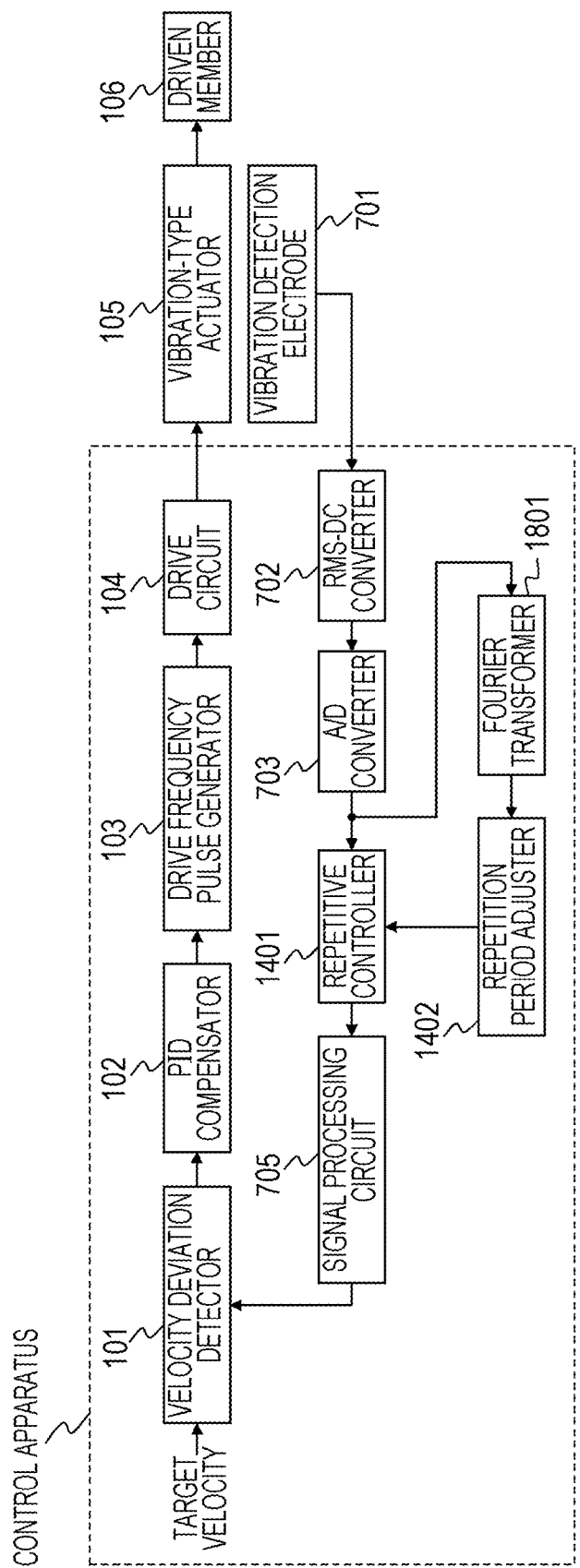
FIG. 14 is a block diagram illustrating a control apparatus of a vibration-type actuator according to a fifth embodiment of the present invention.

This embodiment is characterized in that an S-phase signal is subjected to a frequency analysis during driving and the repetition period of the repetitive controller 1401 is set on the basis of a frequency at which the amplitude reaches the peak thereof. FIG. 14 is a block diagram illustrating a control apparatus of a vibration-type actuator according to a fifth embodiment of the present invention. The basic configuration is the same as in the second embodiment, and description of components that are the same as those of the control apparatus adopting the repetitive controller 1401 illustrated in FIG. 9 is omitted.

In this embodiment, an S-phase signal output from the A/D converter 703 is input to the repetitive controller 1401, as well as to the Fourier transformer 1801. The Fourier transformer 1801 performs discrete multiplication of a plurality of frequencies in order to obtain the frequency characteristics of the amplitude illustrated in FIG. 13B. The frequency at which the amplitude reaches the peak thereof is detected and output as the peak frequency. The reciprocal of the peak frequency, that is, the period of the peak frequency, is input to the repetition period adjuster 1402, and a sampling clock for repetition control is generated. As a result, even if the frequency of a signal corresponding to the number of protrusions of the vibrating member changes during driving, the repetition period of the repetitive controller 1401 is appropriately adjusted, thereby making it possible to accurately detect the rotational speed information. It is to be noted that even if the repetition period of the repetitive controller 1401 is set to half the reciprocal of the peak frequency, the same effect can be produced.

Sixth Embodiment

Figure 15:
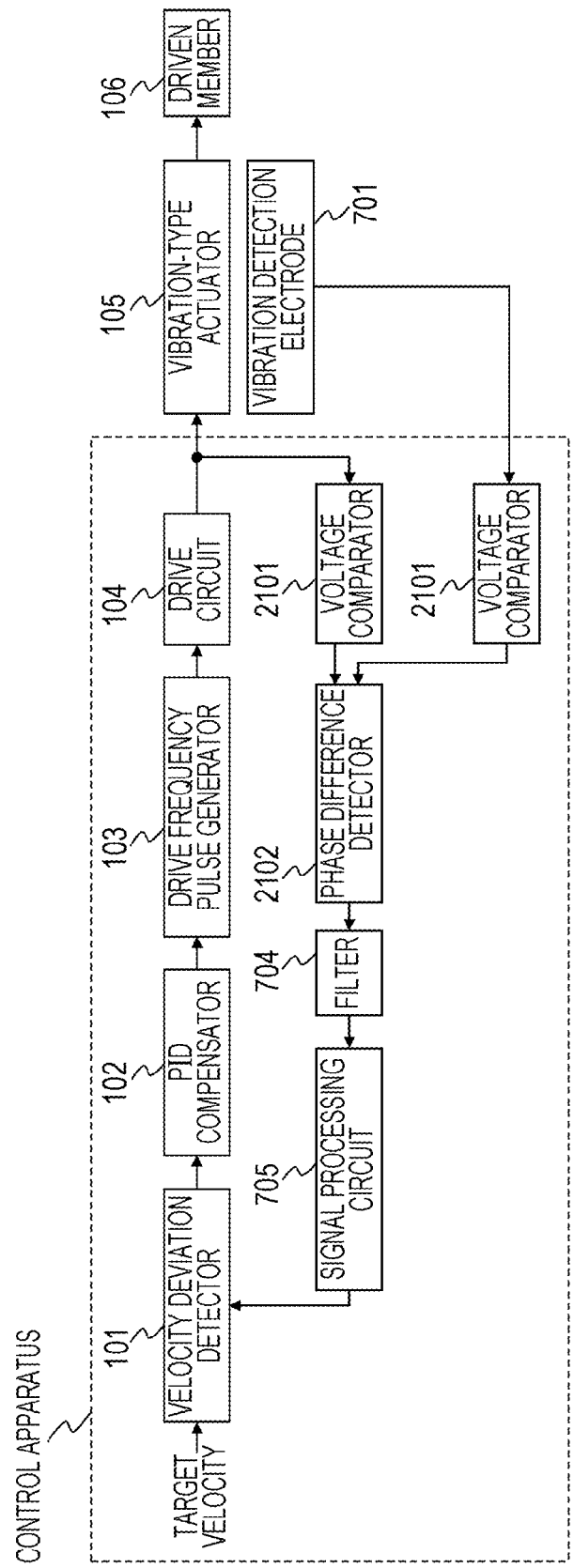
FIG. 15 is a block diagram illustrating a control apparatus of a vibration-type actuator according to a sixth embodiment of the present invention.

This embodiment is characterized in that the phase difference between a drive voltage signal input to a vibration-type actuator and an S-phase signal is detected and a frequency signal corresponding to the number of protrusions of the vibrating member is detected. FIG. 15 is a block diagram illustrating a control apparatus of a vibration-type actuator according to a sixth embodiment of the present invention.

As described above, the mechanical resonance frequency changes depending on the number of protrusions of the vibrating member. Therefore, similar frequency modulation is considered to be generated in a component in which the phase difference between the drive voltage signal and the S-phase signal varies. In view of this, in this embodiment, the phase difference between the drive voltage signal input to the vibration-type actuator and the S-phase signal is detected and the frequency signal corresponding to the number of protrusions of the vibrating member is detected.

Figure 16A:
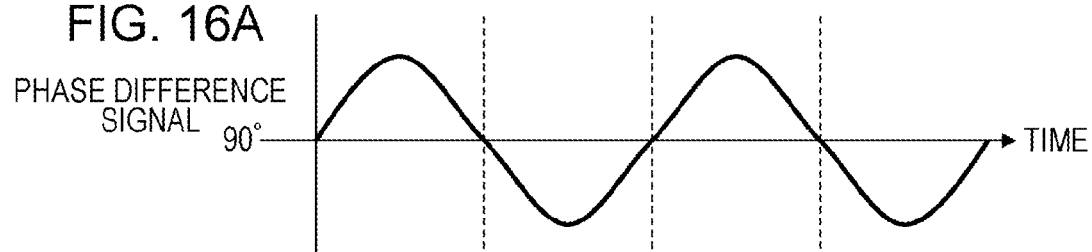
FIGS. 16A to 16D are charts illustrating a detected phase difference signal of a drive voltage signal and an S-phase signal and a method for performing signal processing.

In general, the phase difference between a drive voltage signal applied to a drive electrode of a vibrating member and an S-phase signal has a characteristic that the phase difference changes depending on the difference between the drive frequency and the mechanical resonance frequency. A piezoelectric element to be used is a piezoelectric element that makes the phases of the S-phase signal to be output and the drive voltage signal to be applied the same. For example, the phase difference between a drive voltage signal applied to the A phase and a vibration detection signal (S-phase signal) output from the Sa phase is detected. Each signal is converted in to a pulse signal by a voltage comparator 2101, and then input to a phase difference detector 2102 and detected as a phase difference signal. The waveform of the detected phase difference signal is illustrated in FIG. 16A. The phase difference varies depending on the frequency corresponding to the number of protrusions of the vibrating member.

Figure 16B:
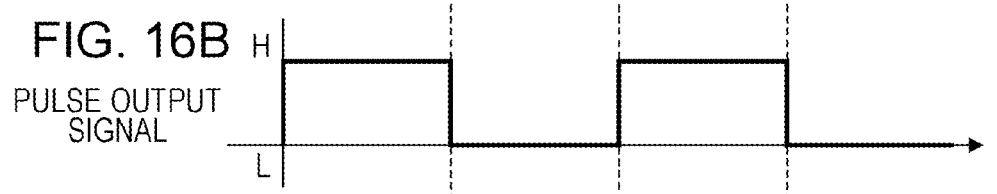
Figure 16C:
Figure 16D:
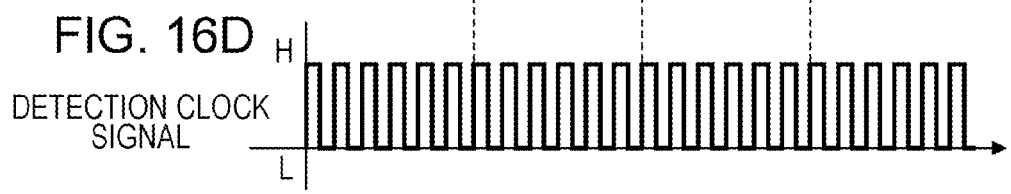

That is, the period of the frequency at which the phase difference varies is equivalent to the period of the frequency at which the amplitude of an S-phase signal varies, which has been described in the first embodiment, and the rotational speed information can be obtained using the filter 704 and the signal processing circuit 705 that are the same as in the first embodiment. As in the first embodiment, the phase difference signal illustrated in FIG. 16A that has passed through the filter 704 is, as illustrated in FIG. 7A, initially input to the digital comparator 1001 and output as a pulse signal. The pulse signal to be output is illustrated in FIG. 16B. The pulse signal is then input to the edge detector 1002 and a rising edge of the pulse signal is detected by a detection clock. The detection clock signal is illustrated in FIG. 16D and the rising edge signal output by the edge detector 1002 is illustrated in FIG. 16C. One period of the rising edge signal is a period corresponding to the number of protrusions of the vibrating member. The following process performed until the rotational speed is obtained is the same as the process described in the first embodiment, and therefore description thereof is omitted.

Seventh Embodiment

Figure 17:
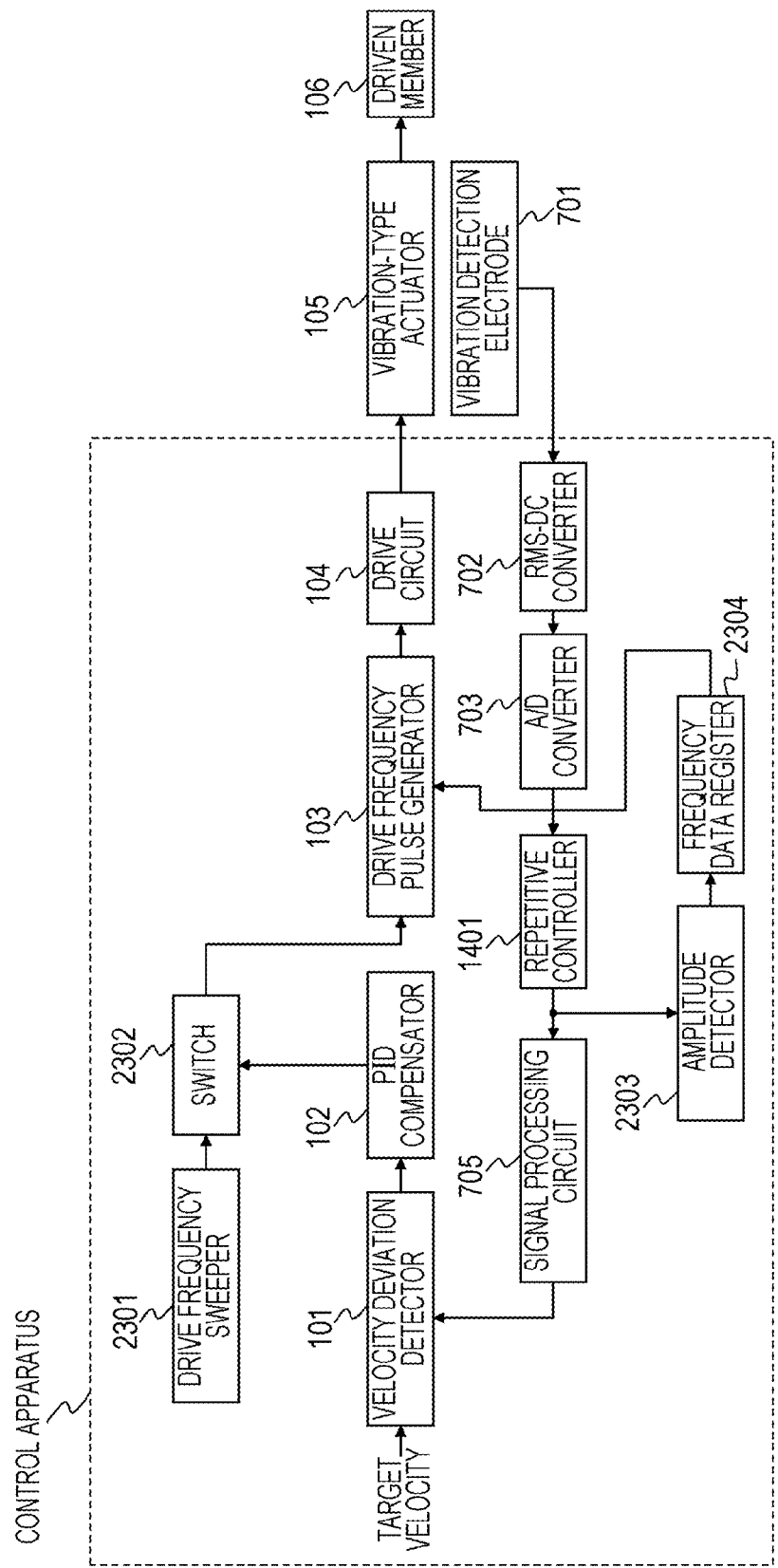
FIG. 17 is a block diagram illustrating a control apparatus of a vibration-type actuator according to a seventh embodiment of the present invention.

This embodiment is characterized in that the drive frequency is swept before velocity control is performed, and the velocity control is begun after a drive frequency at which the amplitude of an S-phase signal output from the repetitive controller 1401 reaches the peak thereof is stored during the sweep. FIG. 17 is a block diagram illustrating a control apparatus of a vibration-type actuator according to a seventh embodiment of the present invention. The basic configuration is the same as in the second embodiment, and description of components that are the same as those of the control apparatus adopting the repetitive controller 1401 illustrated in FIG. 9 is omitted.

Figure 18:
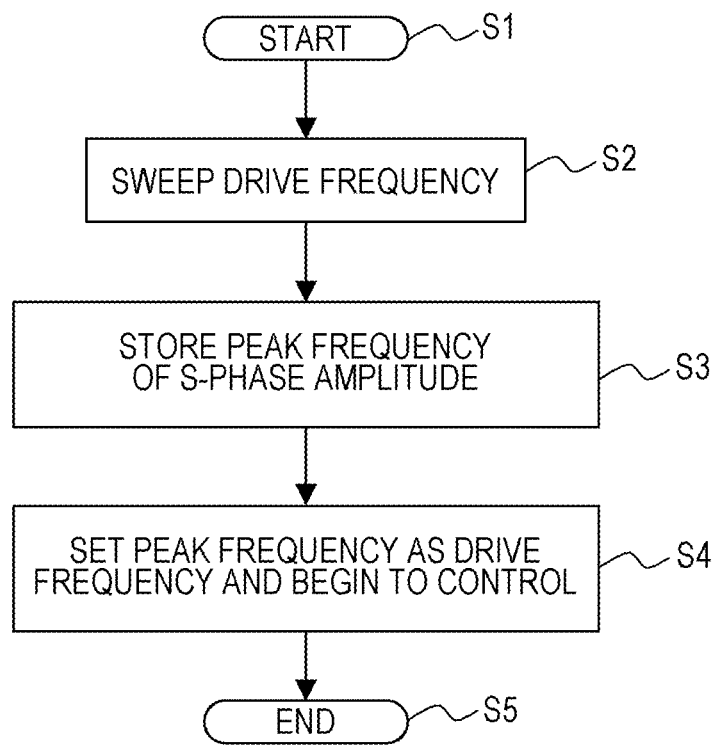
FIG. 18 is a flowchart illustrating the drive sequence of the control apparatus according to the seventh embodiment of the present invention.

FIG. 18 is a flowchart illustrating the drive sequence of the control apparatus according to this embodiment. First, a drive start command is input to the control apparatus from an instruction apparatus, which is not illustrated (S1). Next, a signal having a frequency within a drivable range is selected by a switch 2302 from a drive frequency sweeper 2301 illustrated in FIG. 17 and input to the drive frequency pulse generator 103. The drive frequency sweeper 2301 sweeps the frequency from, for example, 50 kHz to 46 kHz at constant speed as in the F-V table illustrated in FIG. 12B (S2).

Figure 19:
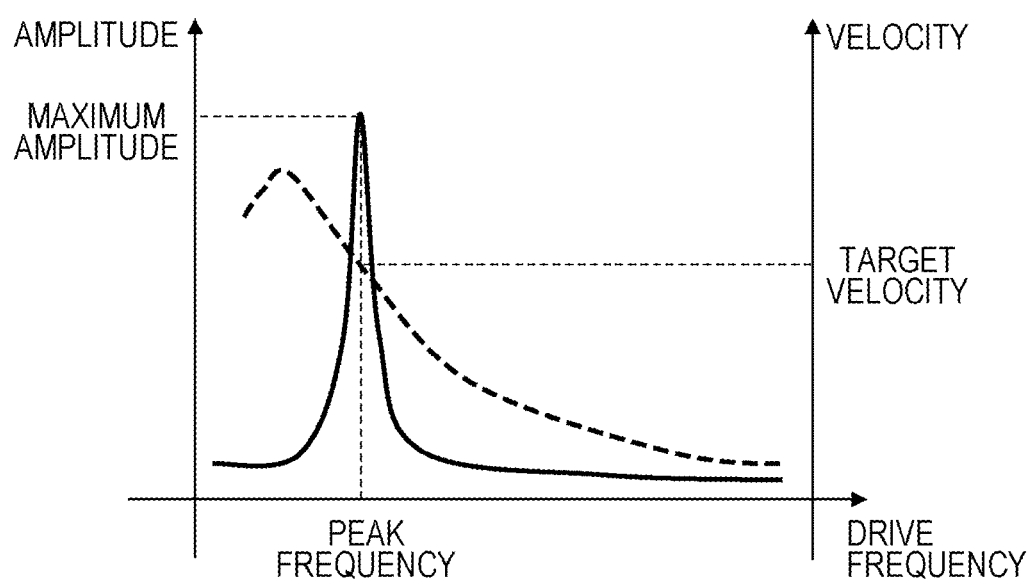
FIG. 19 is a graph illustrating a change in the amplitude of an S-phase signal output from the repetitive controller during a frequency sweep.

At the same time as the frequency sweep, the S-phase signal output from the repetitive controller 1401 is detected by an amplitude detector 2303 and a value of the amplitude corresponding to a change in the drive frequency is monitored. This operation is illustrated in FIG. 19. The horizontal axis in FIG. 19 represents the drive frequency, the vertical axis on the left represents the S-phase amplitude after the repetition control, and the vertical axis on the right represents the velocity of the moving member. Since the repetition period of the repetitive controller 1401 is fixed to a value calculated from the target velocity and the number of protrusions of the vibrating member, the amplitude of the S-phase signal is increased only when the rotational speed of the moving member is the same as the target velocity. Therefore, when the rotational speed of the moving member exceeds the target velocity during the frequency sweep, the peak frequency at which the amplitude reaches the peak thereof can be obtained. The detected peak frequency is stored in a frequency data register 2304 (S3).

Next, the stored value of the peak frequency is input to the drive frequency pulse generator 103. The peak frequency is set as the drive frequency and the velocity control is begun (S4).

As a result, since driving can be performed at the drive frequency close to the target velocity from the beginning of the control, the S/N ratio of the frequency signal corresponding to the number of protrusions of the vibrating member can be sufficiently increased by the repetitive controller 1401, thereby making it possible to accurately detect the rotational speed information.

Eighth Embodiment

In this embodiment, not only detection of the rotational speed of the moving member but also detection of information regarding the absolute position of the moving member is possible. This embodiment is characterized in that the absolute position of the moving member is obtained using information regarding the frequency corresponding to the plurality of protrusions of the vibrating member. The "absolute position" in the present invention refers to a position relative to a certain origin position.

First, a mode in which the absolute positions of two moving members are detected when two vibration-type actuator are simultaneously driven. Because the two moving members rotate at the same velocity, the rotational positions of the two moving members are the same.

Figure 20:
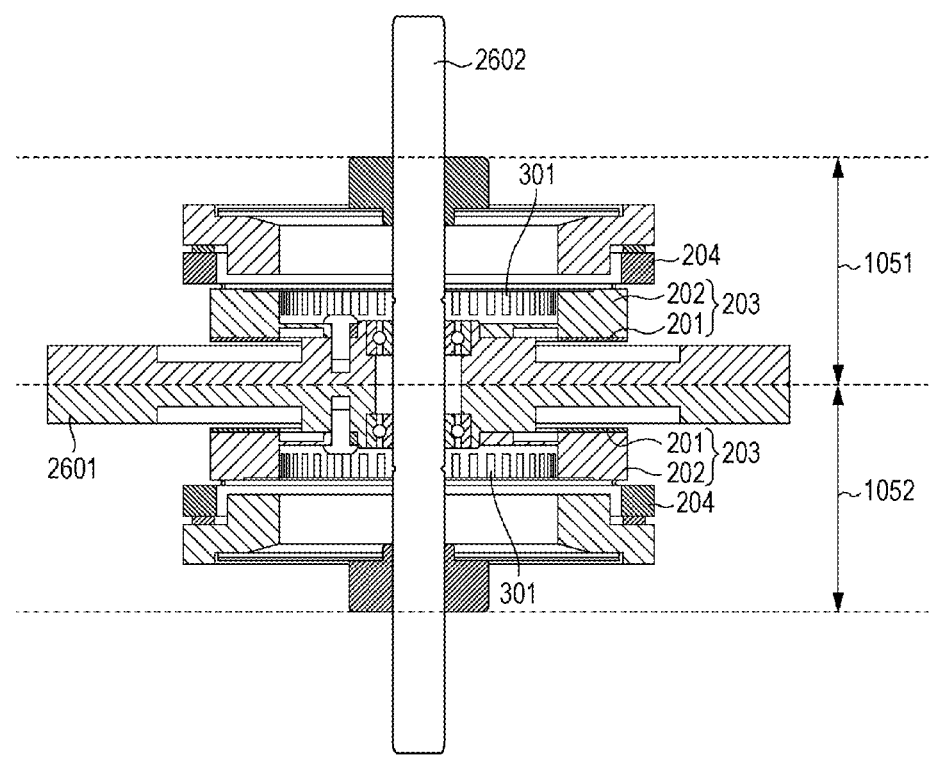
FIG. 20 is a schematic diagram illustrating the configuration obtained by combining two vibration-type actuators according to an eighth embodiment.

FIG. 20 is a schematic diagram illustrating a cross-section of a configuration obtained by combining two vibration-type actuators. Two vibration-type actuators 1051 and 1052 are mounted on a common housing 2601 and connected to upper and lower objects, respectively, through a single output shaft 2602. The basic configuration of each vibration-type actuator is the same as that illustrated in FIGS. 2A, 2B and 2C and therefore only the characteristic configuration of this embodiment will be described hereinafter.

By applying alternating voltages output from the same drive circuit to drive electrodes of the two vibration-type actuators 1501 and 1502 while switching the A phase and the B phase, moving members 204 are driven in such a way as to rotate in the same direction. Driven bodies (not illustrated) are rotated through the single output shaft 2602.

When two vibration-type actuators are used, the configurations of the two vibration-type actuators are normally the same. However, in this embodiment, in order to detect the absolute positions of the moving members 204, vibrating members are configured to have different numbers of protrusions. In this embodiment, for example, an example will be described in which the number of protrusions of the vibrating member of the vibration-type actuator 1051 is forty-seven and the number of protrusions of the vibrating member of the vibration-type actuator 1502 is forty-six.

Figure 21:
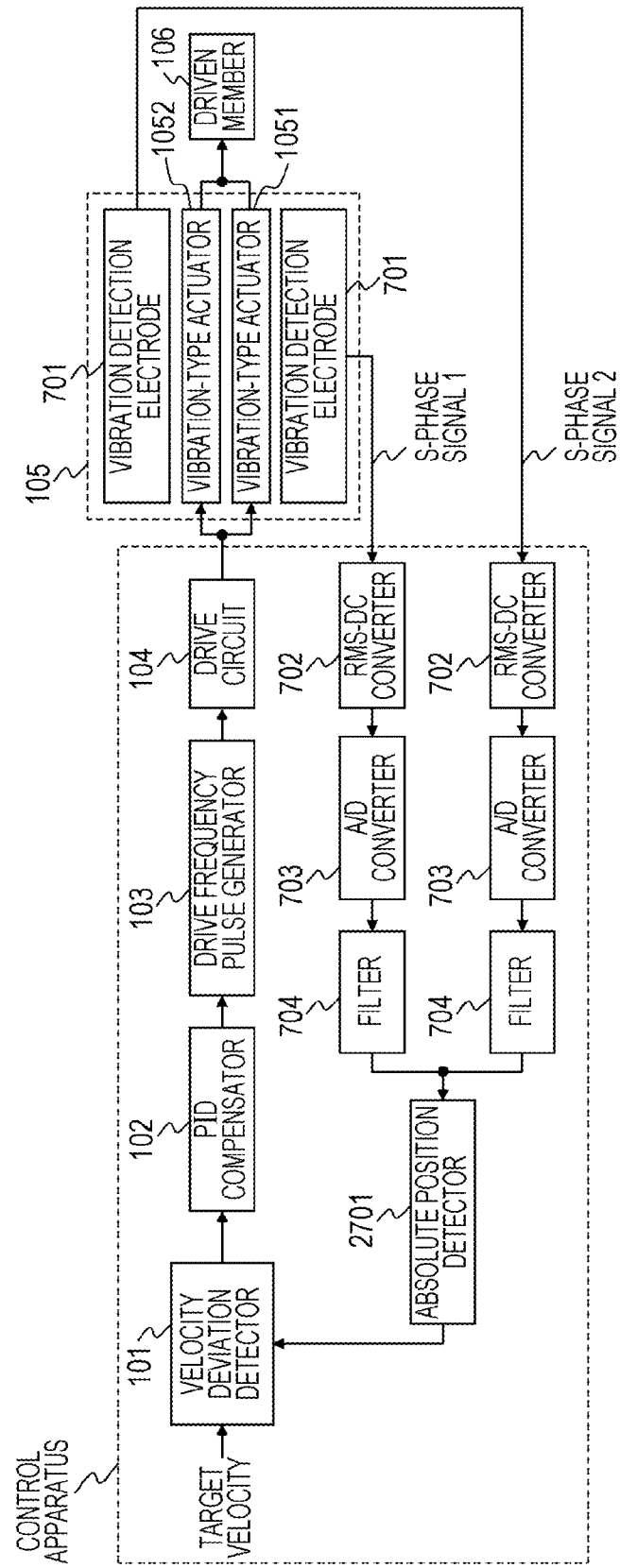
FIG. 21 is a block diagram illustrating a control apparatus of a vibration-type actuator according to the eighth embodiment of the present invention.

FIG. 21 is a block diagram illustrating a control apparatus of the vibration-type actuators 1501 and 1502 according to an eighth embodiment of the present invention. The control apparatus is characterized in that, in order to detect the absolute positions, two S-phase signals are detected from the vibration detection electrodes 701 provided for the two vibration-type actuators 1051 and 1502 and the phase difference between the two S-phase signals is detected.

Figure 22A:
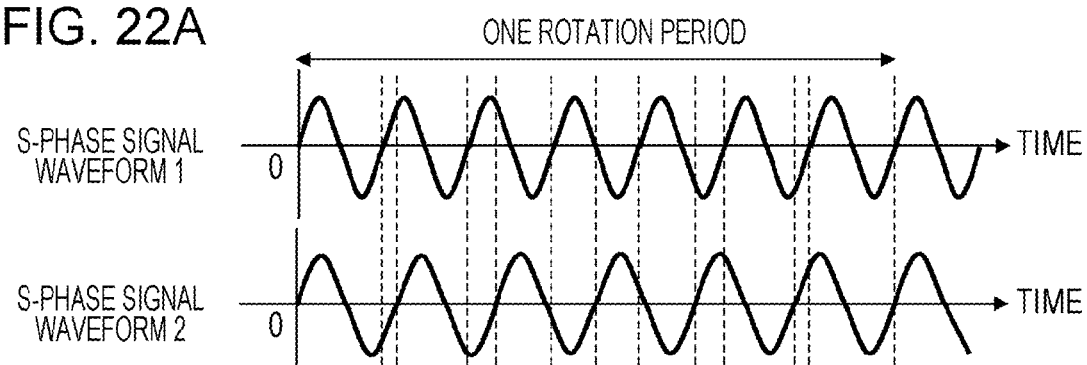
FIGS. 22A to 22C are charts illustrating a method for detecting information regarding an absolute position according to the eighth embodiment of the present invention.

The S-phase signals detected from the two vibration-type actuators 1051 and 1052 are subjected to the RMS-DC conversion, and then subjected to the A/D conversion and the filtering process. The waveform of each S-phase signal after the S-phase signals are output from filters 704 is illustrated in FIG. 22A. In an S-phase signal waveform 1 of the vibration-type actuator 1501, forty-seven sine waves are generated during one rotation period of the moving member 204 in accordance with the number of protrusions. On the other hand, in an S-phase signal waveform 2 of the vibration-type actuator 1502, forty-six sine waves are generated during one rotation period of the moving member 204. In FIG. 22A, the sine waves in the S-phase signals waveforms 1 and 2 are expressed as seven waves and six waves, respectively, in order to simplify the description.

Figure 22B:
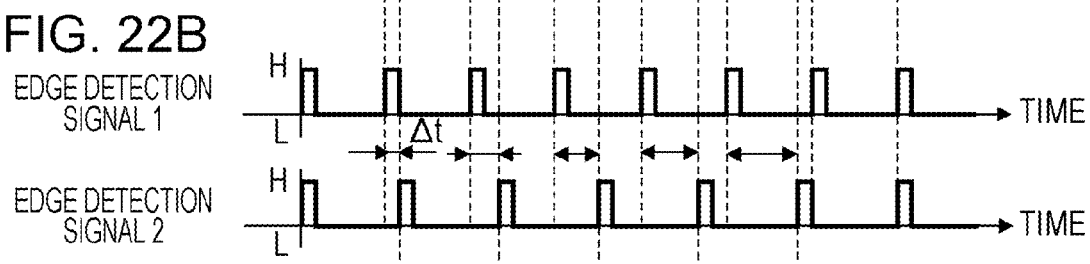

The two S-phase signal waveforms 1 and 2 are input to an absolute position detector 2701. A method for performing signal processing using the absolute positions detector 2701 will be described. FIG. 22B illustrates pulse signals obtained by detecting rising edges of the two S-phase signal waveforms 1 and 2. By comparing the phase difference between the pulses of edge detection signals 1 and 2, it can be seen that the phases are the same at the origin position and gradually deviate from each other, and then the phases are reset to the origin position after one rotation period, when the phase difference becomes 360°.

Figure 22C:
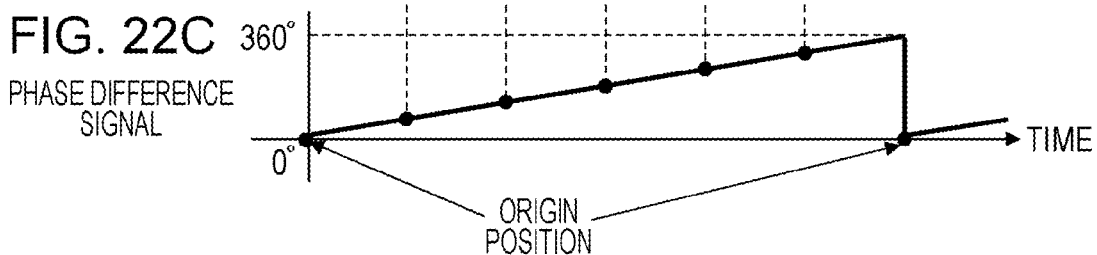

That is, a phase corresponding to a difference in the number of protrusions, namely one protrusion, is deviated during one rotation period. A phase difference signal illustrated in FIG. 22C is a signal obtained by detecting the phase difference from the edge detection signal 1 when the pulse of the edge detection signal 2 becomes "H" and by performing linear interpolation. By converting the phase into the position on the basis of the phase difference signal, it is possible to detect the information regarding the absolute position relative to the origin position. In addition, this embodiment can be applied to a case in which one moving member is rotated by two vibrating members.

Next, a mode in which the origin position is detected by a single vibration-type actuator in a simplified manner in order to obtain the information regarding the absolution position will be described.

Figure 23A:
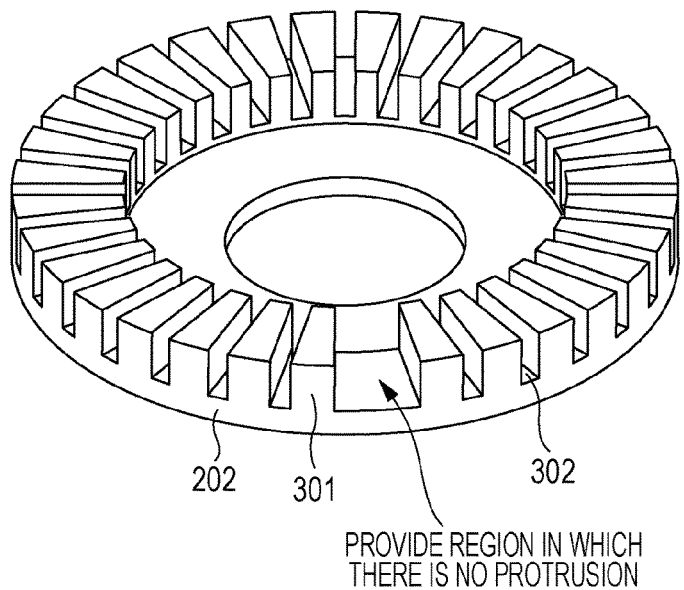
FIGS. 23A to 23D are schematic diagrams illustrating the configuration of a vibrating member provided with a region in which there is no protrusion that can be applied to the present invention.
Figure 23B:
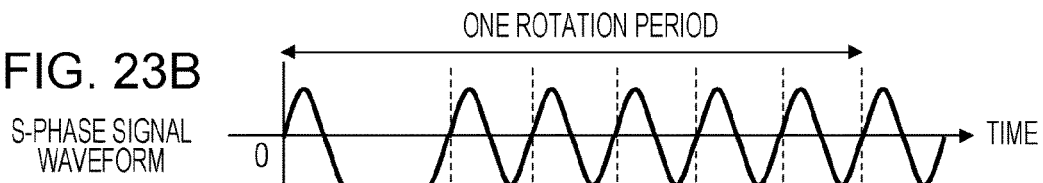
Figure 23C:
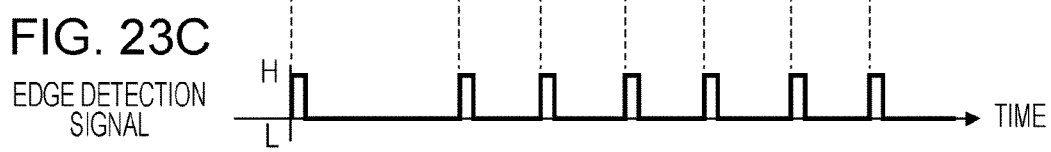
Figure 23D:

FIG. 23A is a schematic diagram illustrating the configuration of a vibrating member having a region in which there is no protrusion, which is periodically provided in other regions. It is to be noted that since it is sufficient if there is a region in which a protrusion does not come into contact with the moving member, a configuration in which, for example, the heights of some protrusions are relatively small may also be possible. FIG. 23B is a graph illustrating the waveform of an S-phase signal when a vibration-type actuator adopting the vibrating member illustrated in FIG. 23A is driven. Since there is a region in which a protrusion does not come into contact with the vibrating member, a portion in which one sine wave is not generated is generated in the same position in each rotation period. FIG. 23C illustrates an edge detection signal. In this embodiment, the origin position can be identified by detecting a portion in which a pulse is not output. That is, by using the information regarding the frequency corresponding to the number of protrusions, it is possible to identify the origin position. Once the origin position can be detected, it is possible to obtain the information regarding the absolute position by counting the number of pulses of the edge detection signal.

Ninth Embodiment

The control circuit of the vibration-type actuator in the present invention can be applied to vibration-type actuators other than the vibration-type actuator described in the first embodiment. In this embodiment, a vibration-type actuator different from the circular vibration-type actuator according to the first embodiment illustrated in FIG. 2, which relatively moves the moving member by forming a traveling wave on the vibrating member, will be described.

Figure 24:
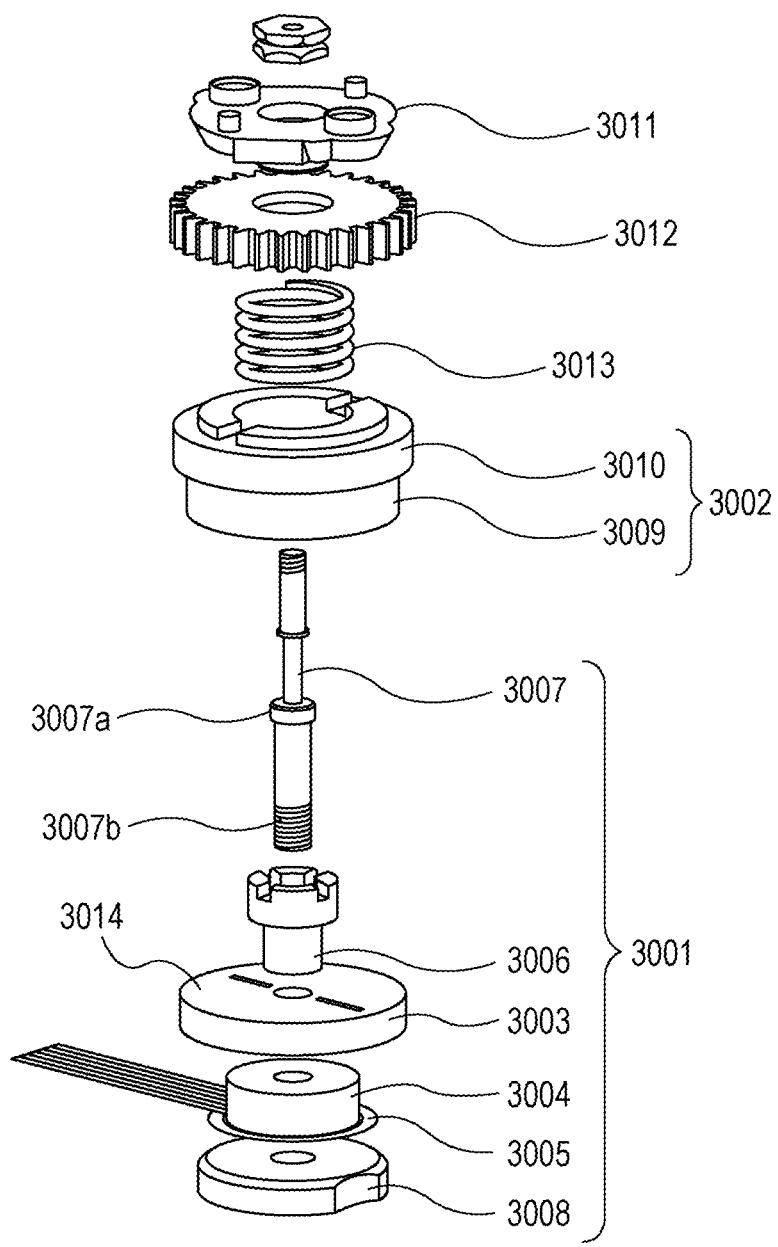
FIG. 24 is an exploded perspective view of a rod-shaped vibration-type actuator.

FIG. 24 is an exploded perspective view of a rod-shaped vibration-type actuator to be used for autofocus drive of a camera lens or the like. The vibration-type actuator has a vibrating member 3001 and a moving member 3002. In the vibrating member 3001, a first elastic member 3003 that also serves as a friction material, a flexible printed board 3005 for supplying power to a piezoelectric element 3004, which is an electromechanical energy conversion element, and a second elastic member 3006 are provided. These members are sandwiched by an end flange 3007a of a shaft 3007 and a lower nut 3008 mounted on a threaded portion 3007b located at lower end of the shaft 3007, and fixed in a pressurized manner.

The first elastic member 3003 is, for example, a sintered ceramic mainly composed of alumina. Upper and lower surfaces of the first elastic member 3003 have been subjected to double-disk grinding and then the upper surface, which is a friction surface, has been subjected to final polishing. In the moving member 3002, a contact spring 3009 is adhered and fixed to a rotor 3010. Therefore, the moving member 3002 is in contact with a friction surface 3014 of the vibrating member 3001 in a pressurized manner by an output gear 3012 that is rotatably supported by a bearing of a flange 3011 and a pressure spring 3013.

The contact spring 3009 of the moving member 3002 is formed in such a way as to have a cylindrical shape having a small crank-shaped cross-section obtained through drawing of a stainless material. A lower surface of the contact surface 3009 is in contact with the friction surface 3014 of the first elastic member 3003 of the vibrating member 3001 as a friction surface of the moving member 3002. An alternating signal is applied from a power supply, which is not illustrated, to the piezoelectric element 3004 through the flexible printed board 3005. In doing so, first-order flexural vibration having two directions that are orthogonal to each other is excited on the friction surface 3014 of the first elastic member 3003. By overlapping the directions at a time phase π/2, a spheroidal motion is generated in the friction surface 3014. Thus, the contact spring 3009, which is in contact with the friction surface 3014 in a pressurized manner, is moved relative to the vibrating member 3001.

Figure 25A:
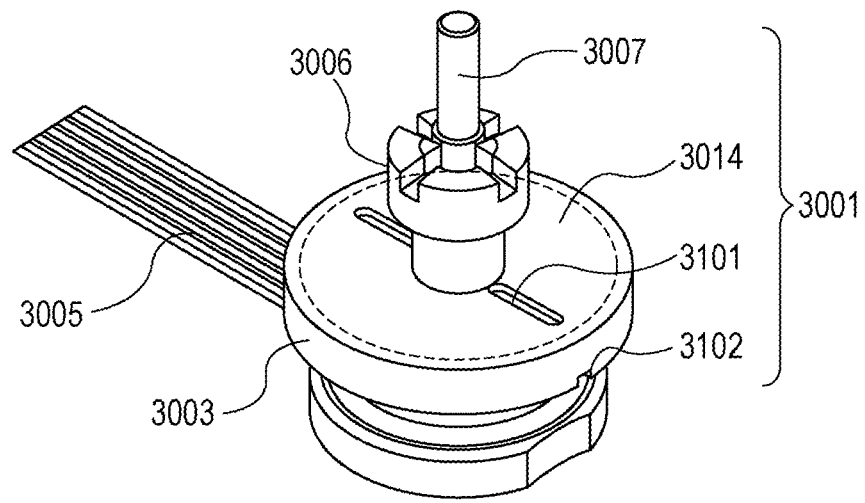
FIGS. 25A and 25B are perspective views of vibrating members whose elastic bodies are provided with radial grooves.
Figure 25B:
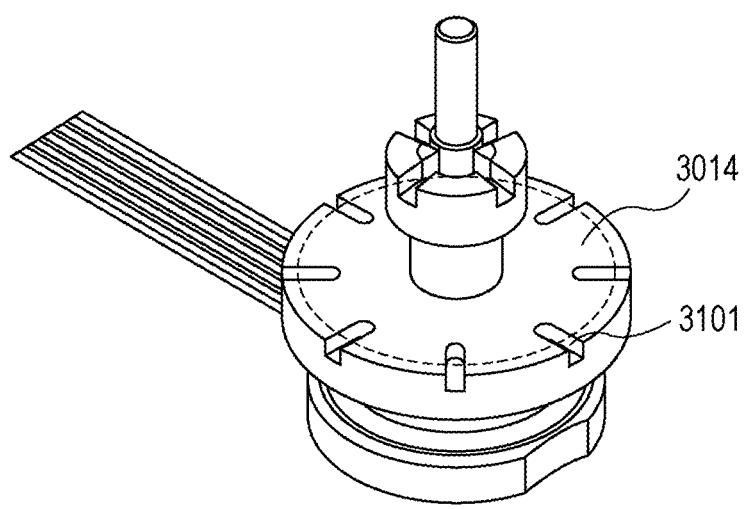

FIGS. 25A and 25B are perspective views of vibrating members whose elastic bodies are provided with radial grooves. In a vibrating member 3001 illustrated in FIG. 25A, radial grooves (two in this embodiment) 3101 and 3102 are provided in upper and lower surfaces of a first elastic member 3003, respectively, in portions close to fixing surfaces. In addition, in a vibrating member 3001 illustrated in FIG. 25B, eight radial grooves 3101 are provided in an upper surface of a first elastic member 3003. By providing such radial grooves 3101, it is possible to prevent the torque from decreasing due to the moisture in the atmosphere.

In variations in the amplitude of an S-phase signal based on the friction surface 3014 (corresponding to the protrusions in the present invention) including the plurality of radial grooves 3101 and the distribution of contact regions of the moving member 3002, the peak is generated at a frequency corresponding to the number of the grooves 3101 in the vibrating member 3001, namely two (the number of protrusions is also two), in the example illustrated in FIG. 25A. In addition, in the example illustrated in FIG. 25B, the peak is generated at a frequency corresponding to the number of the grooves 3101 of the vibrating member 3001, namely eight (the number of protrusions is also eight).

Even if such vibrating members are used, the rotational speed information can be obtained using the information regarding the frequency corresponding to the number of protrusions as in the first to seventh embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus of a vibration-type actuator that relatively rotates a vibrator and a member that is in contact with a plurality of protrusions of the vibrator by applying an alternating voltage to an electromechanical energy conversion element of the vibrator, the control apparatus comprising:
   a repetitive controller that performs repetition control on a detection signal in order to detect information regarding a frequency corresponding to a number of the plurality of protrusions,
   wherein the detection signal is output from a vibration detection electrode of the vibrator,
   wherein a repetition period of the repetitive controller is set to a reciprocal of a frequency represented by a product of the number of the plurality of protrusions and a target speed or to half the reciprocal,
   wherein information regarding a relative speed of the vibrator and the member is obtained using information regarding the frequency corresponding to the number of the plurality of protrusions, and
   wherein the information regarding the relative speed is provided in a feedback control for controlling the vibration-type actuator.

2. The control apparatus of the vibration-type actuator according to claim 1 further comprising:
   a converter for reducing a drive frequency component of the detection signal.

3. The control apparatus of the vibration-type actuator according to claim 1 further comprising:
   an amplitude detector that detects an amplitude of an output signal of the repetitive controller when a frequency of the alternating voltage is swept; and
   a pulse generator that sets a frequency at which the amplitude is largest as the frequency of the alternating voltage.

4. The control apparatus of the vibration-type actuator according to claim 1,
   wherein the information regarding the relative speed is obtained using a relation among the information regarding the relative speed, the number of the plurality of protrusions, and the information regarding the frequency corresponding to the number of the plurality of protrusions.

5. The control apparatus of the vibration-type actuator according to claim 1,
   wherein the vibration-type actuator is a circular vibration-type actuator.

6. The control apparatus of the vibration-type actuator according to claim 1,
   wherein the vibration-type actuator is a rod-shaped vibration-type actuator.

7. An apparatus comprising:
   a vibration-type actuator for relatively rotating a vibrator and a member; and
   a controller for controlling the vibration-type actuator,
   wherein the controller is the control apparatus according to claim 1.

8. A control apparatus of a vibration-type actuator that relatively rotates a vibrator and a member that is in contact with a plurality of protrusions of the vibrator by applying an alternating voltage to an electromechanical energy conversion element of the vibrator, the control apparatus comprising:

a Fourier transformer that performs a frequency analysis on a detection signal; and
a repetitive controller that performs repetition control on the detection signal in order to detect information regarding a frequency corresponding to a number of the plurality of protrusions,
wherein the detection signal is output from a vibration detection electrode of the vibrator,
wherein a repetition period of the repetitive controller is set to a reciprocal of a frequency at which an amplitude detected by the frequency analysis is largest or to half the reciprocal, and
wherein information regarding a relative speed of the vibrator and the member is obtained using the information regarding the frequency corresponding to the number of the plurality of protrusion, wherein the information regarding the relative speed is provided in a feedback control for controlling the vibration-type actuator.

9. A control apparatus of a vibration-type actuator that relatively rotates a vibrator and a member that is in contact with a plurality of protrusions of the vibrator by applying an alternating voltage to an electromechanical energy conversion element of the vibrator, the control apparatus comprising:
amplifier for amplifying a signal component of a detection signal in order to detect information regarding a frequency corresponding to a number of the plurality of protrusions,
wherein the detection signal is output from a vibration detection electrode of the vibrator,
wherein a frequency of the signal component is represented by a product of the number of the plurality of protrusions and a target speed,
wherein information regarding a relative speed of the vibrator and the member is obtained using the information regarding the frequency corresponding to the number of the plurality of protrusions, and
wherein the information regarding the relative speed of the vibrator and the member is provided in a feedback control for controlling the vibration-type actuator.

10. A control apparatus of a vibration-type actuator that relatively rotates a vibrator and a member that is in contact with a plurality of protrusions of the vibrator by applying an alternating voltage to an electromechanical energy conversion element of the vibrator, the control apparatus comprising:
a filter for extracting a signal component from a detection signal in order to detect information regarding a frequency corresponding to a number of the plurality of protrusions,
wherein the detection signal is output from a vibration detection electrode of the vibrator,
wherein a frequency of the signal component is represented by a product of the number of the plurality of protrusions and a target speed,
wherein information regarding a relative speed of the vibrator and the member is obtained using the information regarding the frequency corresponding to the number of the plurality of protrusions, and
wherein the information regarding the relative speed is provided in a feedback control for controlling the vibration-type actuator.

* * * * *